(12) United States Patent
Meersseman et al.

(10) Patent No.: US 10,927,553 B2
(45) Date of Patent: Feb. 23, 2021

(54) FLOOR PANEL

(71) Applicant: FLOORING INDUSTRIES LIMITED, SARL, Bertrange (LU)

(72) Inventors: Laurent Meersseman, Mont de l'Enclus (BE); Martin Segaert, Ypres (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 16/796,195

(22) Filed: Feb. 20, 2020

(65) Prior Publication Data

US 2020/0190817 A1   Jun. 18, 2020

Related U.S. Application Data

(60) Continuation of application No. 15/695,163, filed on Sep. 5, 2017, now Pat. No. 10,597,876, which is a (Continued)

(30) Foreign Application Priority Data

May 10, 2010   (BE) .................................. 2010/0283

(51) Int. Cl.
*E04C 1/00* (2006.01)
*E04F 15/02* (2006.01)
(Continued)

(52) U.S. Cl.
CPC ........ *E04F 15/02038* (2013.01); *B29C 48/21* (2019.02); *B32B 3/06* (2013.01);
(Continued)

(58) Field of Classification Search
CPC .......... E04F 15/02038; E04F 15/02194; E04F 15/10; E04F 15/102; E04F 15/105;
(Continued)

(56) References Cited

U.S. PATENT DOCUMENTS 1,387,011 A   8/1921 Ratcliff
1,448,180 A   3/1923 Atwood et al.
(Continued)

FOREIGN PATENT DOCUMENTS

BE   1011466 A6   10/1999
BE   1017703 A6   4/2009
(Continued)

OTHER PUBLICATIONS

Search Report from corresponding Belgian Application No. BE201000441, dated Feb. 25, 2011.
(Continued)

*Primary Examiner* — Basil S Katcheves
(74) *Attorney, Agent, or Firm* — Workman Nydegger

(57) ABSTRACT

A floor may include a substrate having a top side and a bottom side. A top layer may be provided on the substrate. The top layer may consist of a printed thermoplastic film and a thermoplastic transparent or translucent layer provided on the printed thermoplastic film. The top layer may be directly adhered to the substrate by heat welding the printed thermoplastic film and the top side of the substrate, in the absence of a glue layer. The substrate may be a synthetic material board including a filler. The substrate at least at two opposite edges may include coupling means provided in the synthetic material board. The thermoplastic transparent or translucent layer may be provided with a structure.

20 Claims, 3 Drawing Sheets

Related U.S. Application Data continuation of application No. 15/045,389, filed on Feb. 17, 2016, now Pat. No. 9,783,995, which is a continuation of application No. 14/015,307, filed on Aug. 30, 2013, now Pat. No. 9,322,184, which is a division of application No. 13/696,769, filed as application No. PCT/IB2011/051884 on Apr. 28, 2011, now Pat. No. 8,549,807.

(51) Int. Cl.

| | | |
|---|---|---|
| *B29C 48/21* | (2019.01) | |
| *B32B 7/12* | (2006.01) | |
| *B32B 21/02* | (2006.01) | |
| *B32B 37/15* | (2006.01) | |
| *B32B 37/22* | (2006.01) | |
| *B44C 1/24* | (2006.01) | |
| *B44C 5/04* | (2006.01) | |
| *B32B 7/02* | (2019.01) | |
| *B32B 27/06* | (2006.01) | |
| *B32B 27/30* | (2006.01) | |
| *B32B 27/40* | (2006.01) | |
| *E04F 15/10* | (2006.01) | |
| *B32B 37/06* | (2006.01) | |
| *B32B 37/16* | (2006.01) | |
| *E04F 15/18* | (2006.01) | |
| *B32B 3/06* | (2006.01) | |
| *B32B 3/12* | (2006.01) | |
| *B32B 5/14* | (2006.01) | |
| *B32B 5/18* | (2006.01) | |
| *B32B 27/08* | (2006.01) | |
| *B32B 27/20* | (2006.01) | |
| *B32B 38/00* | (2006.01) | |

(52) U.S. Cl.
CPC .............. *B32B 3/12* (2013.01); *B32B 5/145* (2013.01); *B32B 5/18* (2013.01); *B32B 7/02* (2013.01); *B32B 7/12* (2013.01); *B32B 21/02* (2013.01); *B32B 27/065* (2013.01); *B32B 27/08* (2013.01); *B32B 27/20* (2013.01); *B32B 27/30* (2013.01); *B32B 27/40* (2013.01); *B32B 37/06* (2013.01); *B32B 37/153* (2013.01); *B32B 37/16* (2013.01); *B32B 37/226* (2013.01); *B44C 1/24* (2013.01); *B44C 5/04* (2013.01); *E04F 15/02194* (2013.01); *E04F 15/10* (2013.01); *E04F 15/102* (2013.01); *E04F 15/105* (2013.01); *E04F 15/107* (2013.01); *E04F 15/18* (2013.01); *B32B 38/145* (2013.01); *B32B 2266/0235* (2013.01); *B32B 2266/08* (2013.01); *B32B 2307/412* (2013.01); *B32B 2307/414* (2013.01); *B32B 2307/72* (2013.01); *B32B 2309/02* (2013.01); *B32B 2309/04* (2013.01); *B32B 2309/105* (2013.01); *B32B 2309/12* (2013.01); *B32B 2310/0825* (2013.01); *B32B 2327/06* (2013.01); *B32B 2419/04* (2013.01); *B32B 2451/00* (2013.01); *B32B 2471/00* (2013.01); *E04F 2201/0107* (2013.01); *E04F 2201/023* (2013.01); *Y10T 156/10* (2015.01); *Y10T 156/1039* (2015.01); *Y10T 156/1084* (2015.01)

(58) Field of Classification Search
CPC . E04F 15/107; E04F 15/18; E04F 2201/0107; E04F 2201/023; B32B 3/12; B32B 5/145; B32B 5/18; B32B 7/02; B32B 7/12; B32B 21/02; B32B 27/065; B32B 27/08; B32B 27/20; B32B 27/30; B32B 27/40; B32B 37/06; B32B 37/153; B32B 37/16; B32B 37/226; B32B 38/145; B32B 2266/0235; B32B 2266/08; B32B 2307/412; B32B 2307/414; Y10T 156/10; Y10T 156/1039; Y10T 156/1084; B29C 47/065
USPC ... 52/DIG. 9, 313, 315, 589.1, 591.1, 592.1, 52/592.2, 592.4
See application file for complete search history.

(56) References Cited

U.S. PATENT DOCUMENTS

| | | |
|---|---|---|
| 1,887,011 A | 9/1930 | Carr et al. |
| 1,921,164 A | 8/1933 | Lewis |
| 1,971,067 A | 8/1934 | Fess |
| 2,143,220 A | 1/1939 | Cheney |
| 3,038,363 A | 6/1962 | Miessner |
| 3,173,804 A | 3/1965 | Standfuss |
| 3,282,010 A | 11/1966 | King, Jr. |
| 3,383,262 A | 5/1968 | Ettore et al. |
| 3,434,861 A | 3/1969 | Luc |
| 3,498,870 A | 3/1970 | Fritchey |
| 3,554,827 A | 1/1971 | Yamagishi |
| 3,740,914 A | 6/1973 | Diez |
| 3,741,851 A | 6/1973 | Erb et al. |
| 3,810,774 A | 5/1974 | Pittman |
| 3,811,915 A | 5/1974 | Burrell et al. |
| 3,853,685 A | 12/1974 | Friedrich et al. |
| 3,905,849 A | 9/1975 | Bomboire |
| 4,050,409 A | 9/1977 | Duchenaud et al. |
| 4,097,635 A | 6/1978 | Sanz Hernández et al. |
| 4,225,374 A | 9/1980 | Kaufmann |
| 4,233,343 A | 11/1980 | Barker et al. |
| 4,242,390 A | 12/1980 | Nemeth |
| 4,312,686 A | 1/1982 | Smith et al. |
| 4,379,198 A | 4/1983 | Jaeschke et al. |
| 4,396,566 A | 8/1983 | Brinkmann et al. |
| 4,397,896 A | 8/1983 | Moran |
| 4,400,862 A | 8/1983 | Ignell |
| 4,426,820 A | 1/1984 | Terbrack et al. |
| 4,471,012 A | 9/1984 | Maxwell |
| 4,614,680 A | 9/1986 | Fry et al. |
| 4,654,099 A | 3/1987 | Sandman |
| 4,690,434 A | 9/1987 | Schmidt |
| 4,778,547 A | 10/1988 | Becker et al. |
| 4,833,855 A | 5/1989 | Winter, IV |
| 4,844,763 A | 7/1989 | Robbins |
| 4,913,858 A | 4/1990 | Miekka et al. |
| 4,948,653 A | 8/1990 | Dinter et al. |
| 4,975,008 A | 12/1990 | Wagner |
| 5,023,140 A | 6/1991 | Glotgelter et al. |
| 5,034,084 A | 7/1991 | Schäfer et al. |
| 5,077,112 A | 12/1991 | Hensel et al. |
| 5,082,495 A | 1/1992 | Iijima |
| 5,112,671 A | 5/1992 | Diamond et al. |
| 5,261,508 A | 11/1993 | Kikuchi |
| 5,275,862 A | 1/1994 | Ramadan et al. |
| 5,344,704 A | 9/1994 | O'Dell et al. |
| 5,394,672 A | 3/1995 | Seem |
| 5,437,964 A | 8/1995 | Witt et al. |
| 5,516,472 A | 5/1996 | Laver |
| 5,560,797 A | 10/1996 | Burt et al. |
| 5,728,476 A | 3/1998 | Harwood et al. |
| 5,755,068 A | 5/1998 | Ormiston |
| 5,787,675 A | 8/1998 | Futagi |
| 5,836,128 A | 11/1998 | Groh et al. |
| 5,863,632 A | 1/1999 | Bisker |
| 5,899,038 A | 5/1999 | Stroppiana |
| 5,916,662 A | 6/1999 | Schmidt |
| 5,928,772 A | 7/1999 | Shiraishi et al. |
| 5,952,076 A | 9/1999 | Foster |
| 5,961,903 A | 10/1999 | Eby et al. |
| 5,976,288 A | 11/1999 | Ekendahl |
| 5,988,503 A | 11/1999 | Kuo |
| 6,006,486 A | 12/1999 | Moriau et al. |
| 6,098,357 A | 8/2000 | Franklin et al. |
| 6,216,409 B1 | 4/2001 | Roy et al. |

(56) References Cited

U.S. PATENT DOCUMENTS

| | | | |
|---|---|---|---|
| 6,256,959 B1 | 7/2001 | Palmersten |
| 6,282,859 B1 | 9/2001 | Van Der Heijden |
| 6,287,678 B1 | 9/2001 | Spengler |
| 6,306,318 B1 | 10/2001 | Ricciardelli et al. |
| 6,333,094 B1 | 12/2001 | Schneider et al. |
| 6,345,481 B1 | 2/2002 | Nelson |
| 6,385,936 B1 | 5/2002 | Schneider |
| 6,444,075 B1 | 9/2002 | Schneider et al. |
| 6,467,224 B1 | 10/2002 | Bertolini |
| 6,477,948 B1 | 11/2002 | Nissing et al. |
| 6,490,836 B1 | 12/2002 | Moriau et al. |
| 6,536,178 B1 | 3/2003 | Pålsson et al. |
| 6,588,166 B2 | 7/2003 | Martensson et al. |
| 6,589,379 B1 | 7/2003 | Harwood et al. |
| 6,591,568 B1 | 7/2003 | Pålsson |
| 6,617,009 B1 | 9/2003 | Chen et al. |
| 6,647,690 B1 | 11/2003 | Martensson |
| 6,764,741 B2 | 7/2004 | Kawasumi et al. |
| 6,769,219 B2 | 8/2004 | Schwitte et al. |
| 6,769,835 B2 | 8/2004 | Stridsman |
| 6,772,568 B2 | 8/2004 | Thiers et al. |
| 6,804,926 B1 | 10/2004 | Eisermann |
| 6,874,282 B1 | 4/2005 | Sweeney et al. |
| 6,880,307 B2 | 4/2005 | Schwitte et al. |
| 6,918,221 B2 | 7/2005 | Williams |
| 6,928,779 B2 | 8/2005 | Moriau et al. |
| 6,931,811 B2 | 8/2005 | Thiers |
| 6,933,043 B1 | 8/2005 | Son et al. |
| 6,955,020 B2 | 10/2005 | Moriau et al. |
| 6,979,487 B2 | 12/2005 | Scarbrough et al. |
| 6,991,830 B1 | 1/2006 | Hansson et al. |
| 6,993,877 B2 | 2/2006 | Moriau et al. |
| 7,040,068 B2 | 5/2006 | Moriau et al. |
| 7,063,768 B2 | 6/2006 | Tsujimoto et al. |
| 7,093,399 B2 | 8/2006 | Thiers et al. |
| 7,169,460 B1 | 1/2007 | Chen et al. |
| 7,243,469 B2 * | 7/2007 | Miller ............... B32B 3/30 52/311.1 |
| 7,328,536 B2 | 2/2008 | Moriau et al. |
| 7,357,959 B2 | 4/2008 | Bauer |
| 7,377,081 B2 | 5/2008 | Ruhdorfer |
| 7,451,578 B2 | 11/2008 | Hannig |
| 7,452,440 B1 | 11/2008 | Tsujimoto et al. |
| 7,467,499 B2 | 12/2008 | Moriau et al. |
| 7,484,337 B2 | 2/2009 | Hecht |
| 7,516,588 B2 | 4/2009 | Pervan |
| 7,584,583 B2 | 9/2009 | Bergelin et al. |
| 7,596,920 B2 | 10/2009 | Konstanczak |
| 7,600,354 B2 | 10/2009 | Knauseder |
| 7,603,826 B1 | 10/2009 | Moebus |
| 7,617,645 B2 | 11/2009 | Moriau et al. |
| 7,621,092 B2 | 11/2009 | Groeke et al. |
| 7,621,094 B2 | 11/2009 | Moriau et al. |
| 7,634,886 B2 | 12/2009 | Moriau et al. |
| 7,634,887 B2 | 12/2009 | Moriau et al. |
| 7,637,066 B2 | 12/2009 | Moriau et al. |
| 7,637,067 B2 | 12/2009 | Moriau et al. |
| 7,640,708 B2 | 1/2010 | Moriau et al. |
| 7,644,554 B2 | 1/2010 | Moriau et al. |
| 7,644,555 B2 | 1/2010 | Moriau et al. |
| 7,644,557 B2 | 1/2010 | Moriau et al. |
| 7,647,741 B2 | 1/2010 | Moriau et al. |
| 7,647,743 B2 | 1/2010 | Moriau et al. |
| 7,650,727 B2 | 1/2010 | Moriau et al. |
| 7,650,728 B2 | 1/2010 | Moriau et al. |
| 7,654,054 B2 | 2/2010 | Moriau et al. |
| 7,658,048 B2 | 2/2010 | Moriau et al. |
| 7,661,238 B2 | 2/2010 | Moriau et al. |
| 7,665,265 B2 | 2/2010 | Moriau et al. |
| 7,665,266 B2 | 2/2010 | Moriau et al. |
| 7,665,267 B2 | 2/2010 | Moriau et al. |
| 7,665,268 B2 | 2/2010 | Moriau et al. |
| 7,669,376 B2 | 3/2010 | Moriau et al. |
| 7,669,377 B2 | 3/2010 | Moriau et al. |
| 7,673,431 B2 | 3/2010 | Moriau et al. |
| 7,677,008 B2 | 3/2010 | Moriau et al. |
| 7,681,371 B2 | 3/2010 | Moriau et al. |
| 7,698,868 B2 | 4/2010 | Moriau et al. |
| 7,698,869 B2 | 4/2010 | Moriau et al. |
| 7,707,793 B2 | 5/2010 | Moriau et al. |
| 7,712,280 B2 | 5/2010 | Moriau et al. |
| 7,726,088 B2 | 6/2010 | Muehlebach |
| 7,726,089 B2 | 6/2010 | Moriau et al. |
| 7,735,288 B2 | 6/2010 | Moriau et al. |
| 7,757,453 B2 | 7/2010 | Moriau et al. |
| 7,762,035 B2 | 7/2010 | Cappelle |
| 7,770,350 B2 | 8/2010 | Moriau et al. |
| 7,810,297 B2 | 10/2010 | Moriau et al. |
| 7,827,754 B2 | 11/2010 | Moriau et al. |
| 7,827,755 B2 | 11/2010 | Moriau et al. |
| 7,836,648 B2 | 11/2010 | Garcia et al. |
| 7,841,145 B2 | 11/2010 | Pervan et al. |
| 7,861,483 B2 | 1/2011 | Dammers |
| 7,930,862 B2 | 4/2011 | Bergelin et al. |
| 7,980,039 B2 | 7/2011 | Groeke et al. |
| 7,984,600 B2 | 7/2011 | Alford et al. |
| 8,038,363 B2 | 10/2011 | Hannig et al. |
| 8,056,236 B2 | 11/2011 | Brouckaert et al. |
| 8,071,193 B2 | 12/2011 | Windmöller |
| 8,099,924 B2 | 1/2012 | Braun |
| 8,112,891 B2 | 2/2012 | Pervan |
| 8,132,384 B2 | 3/2012 | Hannig |
| 8,153,234 B2 * | 4/2012 | Nollet ............... B44B 5/026 428/141 |
| 8,156,705 B2 | 4/2012 | Alford et al. |
| 8,166,723 B2 | 5/2012 | Moriau et al. |
| 8,191,333 B2 | 6/2012 | Braun |
| 8,204,904 B2 | 6/2012 | Bonchi et al. |
| 8,209,928 B2 | 7/2012 | Garcia et al. |
| 8,245,477 B2 | 8/2012 | Pervan |
| 8,245,478 B2 | 8/2012 | Bergelin et al. |
| 8,261,508 B2 | 9/2012 | Thiers |
| 8,272,187 B2 | 9/2012 | Meersseman et al. |
| 8,302,361 B2 | 11/2012 | Braun et al. |
| 8,302,367 B2 | 11/2012 | Schulte |
| 8,303,743 B2 | 11/2012 | Youn et al. |
| 8,335,212 B2 | 12/2012 | Hovey et al. |
| 8,336,272 B2 | 12/2012 | Prager et al. |
| 8,341,915 B2 | 1/2013 | Pervan et al. |
| 8,365,494 B2 | 2/2013 | Moriau et al. |
| 8,375,672 B2 | 2/2013 | Hannig |
| 8,381,476 B2 | 2/2013 | Hannig |
| 8,381,477 B2 | 2/2013 | Pervan et al. |
| 8,407,963 B2 | 4/2013 | Schulte |
| 8,465,804 B2 | 6/2013 | Provoost et al. |
| 8,475,871 B2 | 7/2013 | Oldorff |
| 8,511,031 B2 | 8/2013 | Bergelin et al. |
| 8,511,040 B2 | 8/2013 | Braun et al. |
| 8,516,767 B2 | 8/2013 | Engstrom |
| 8,584,423 B2 | 11/2013 | Pervan et al. |
| 8,621,814 B2 | 1/2014 | Cappelle |
| 8,631,621 B2 | 1/2014 | Hannig |
| 8,726,513 B2 | 5/2014 | Braun et al. |
| 8,789,334 B2 | 7/2014 | Moriau et al. |
| 8,806,830 B2 | 8/2014 | Schacht et al. |
| 8,820,014 B2 | 9/2014 | Durnberger |
| 8,839,584 B2 | 9/2014 | Sokol |
| 8,966,852 B2 | 3/2015 | Cappelle |
| 8,966,853 B2 | 3/2015 | Hannig |
| 8,991,055 B2 | 3/2015 | Cappelle |
| 8,997,429 B2 | 4/2015 | Moriau et al. |
| 9,109,366 B2 | 8/2015 | Schulte |
| 9,145,691 B2 | 9/2015 | Cappelle |
| 9,169,658 B2 | 10/2015 | Hecht |
| 9,194,133 B2 | 11/2015 | Thiers |
| 9,200,460 B2 | 12/2015 | Cappelle |
| 9,222,267 B2 | 12/2015 | Bergelin et al. |
| 9,290,040 B2 | 3/2016 | Verhaeghe |
| 9,290,948 B2 | 3/2016 | Cappelle et al. |
| 9,290,951 B2 | 3/2016 | Moriau et al. |
| 9,322,184 B2 | 4/2016 | Meersseman et al. |
| 9,366,037 B2 | 6/2016 | Cappelle |
| 9,371,654 B2 | 6/2016 | Cappelle |
| 9,487,957 B2 | 11/2016 | Cappelle |

(56) References Cited

U.S. PATENT DOCUMENTS

| | | |
|---|---|---|
| 9,506,256 B2 | 11/2016 | Thiers |
| 9,534,400 B2 | 1/2017 | Schacht et al. |
| 9,695,599 B2 | 7/2017 | Cappelle |
| 9,745,756 B2 | 8/2017 | Hannig |
| 9,765,530 B2 | 9/2017 | Bergelin et al. |
| 9,890,542 B2 | 2/2018 | Cappelle |
| 9,932,741 B2 | 4/2018 | Cappelle et al. |
| 10,094,123 B2 | 10/2018 | Meersseman et al. |
| 10,100,532 B2 | 10/2018 | Schacht et al. |
| 10,100,533 B2 | 10/2018 | Meersseman et al. |
| 10,125,499 B2 | 11/2018 | Cappelle |
| 10,240,348 B2 | 3/2019 | Pervan et al. |
| 10,358,831 B2 | 7/2019 | Cappelle |
| 10,450,760 B2 | 10/2019 | Bergelin et al. |
| 10,519,674 B2 | 12/2019 | Cappelle |
| 2001/0034991 A1 | 11/2001 | Martensson et al. |
| 2002/0009598 A1 | 1/2002 | Lafave et al. |
| 2002/0020127 A1 | 2/2002 | Thiers et al. |
| 2002/0046528 A1 | 4/2002 | Pervan et al. |
| 2002/0056245 A1 | 5/2002 | Thiers |
| 2002/0092252 A1 | 7/2002 | Kettler et al. |
| 2002/0092263 A1 | 7/2002 | Schulte |
| 2002/0136862 A1 | 9/2002 | Dong et al. |
| 2002/0142106 A1 | 10/2002 | Bethune et al. |
| 2002/0160680 A1* | 10/2002 | Laurence .............. B44C 5/0469 442/394 |
| 2002/0170258 A1 | 11/2002 | Schwitte et al. |
| 2002/0189183 A1* | 12/2002 | Ricciardelli .......... B32B 27/304 52/390 |
| 2003/0024199 A1* | 2/2003 | Pervan .............. E04F 15/02011 52/589.1 |
| 2003/0024200 A1 | 2/2003 | Moriau et al. |
| 2003/0024201 A1 | 2/2003 | Moriau et al. |
| 2003/0029115 A1 | 2/2003 | Moriau et al. |
| 2003/0029116 A1 | 2/2003 | Moriau et al. |
| 2003/0029117 A1 | 2/2003 | Moriau et al. |
| 2003/0029119 A1 | 2/2003 | Coleman |
| 2003/0033777 A1 | 2/2003 | Thiers et al. |
| 2003/0033779 A1 | 2/2003 | Downey |
| 2003/0037504 A1 | 2/2003 | Schwitte et al. |
| 2003/0097808 A1 | 5/2003 | Sabatini |
| 2003/0101674 A1 | 6/2003 | Pervan et al. |
| 2003/0159385 A1 | 8/2003 | Thiers |
| 2003/0159777 A1 | 8/2003 | Tsujimoto et al. |
| 2004/0016197 A1 | 1/2004 | Ruhdorfer |
| 2004/0020145 A1 | 2/2004 | Matsufuji |
| 2004/0026017 A1 | 2/2004 | Taylor et al. |
| 2004/0028830 A1 | 2/2004 | Bauer |
| 2004/0068954 A1 | 4/2004 | Martensson |
| 2004/0071978 A1 | 4/2004 | Hallenbeck et al. |
| 2004/0102120 A1 | 5/2004 | Plusquellec et al. |
| 2004/0103602 A1 | 6/2004 | Geraud |
| 2004/0126550 A1 | 7/2004 | Grafenauer |
| 2004/0128934 A1 | 7/2004 | Hecht |
| 2004/0137248 A1 | 7/2004 | Elsasser |
| 2004/0139678 A1 | 7/2004 | Pervan |
| 2004/0139679 A1 | 7/2004 | Della Pepa |
| 2004/0146695 A1 | 7/2004 | Hardwick |
| 2004/0161588 A1 | 8/2004 | Mauk et al. |
| 2004/0168392 A1 | 9/2004 | Konzelmann et al. |
| 2004/0182036 A1 | 9/2004 | Sjoberg et al. |
| 2004/0191547 A1 | 9/2004 | Oldorff |
| 2004/0211143 A1 | 10/2004 | Hannig |
| 2004/0250914 A1 | 12/2004 | Olofsson |
| 2004/0255538 A1 | 12/2004 | Ruhdorfer |
| 2005/0016107 A1 | 1/2005 | Rosenthal et al. |
| 2005/0025934 A1* | 2/2005 | Thiers .................. E04F 15/181 428/151 |
| 2005/0050827 A1 | 3/2005 | Schitter |
| 2005/0153243 A1 | 7/2005 | Rundle et al. |
| 2005/0186393 A1 | 8/2005 | Wilson |
| 2005/0208255 A1 | 9/2005 | Pervan |
| 2005/0221056 A1 | 10/2005 | Schwonke et al. |
| 2005/0224174 A1 | 10/2005 | Tsujimoto et al. |
| 2005/0249929 A1 | 11/2005 | Reichwein et al. |
| 2005/0281986 A1* | 12/2005 | Nam ...................... B32B 21/06 428/172 |
| 2005/0284075 A1 | 12/2005 | Moriau et al. |
| 2005/0284076 A1 | 12/2005 | Moriau et al. |
| 2006/0005499 A1 | 1/2006 | Moriau et al. |
| 2006/0008630 A1 | 1/2006 | Thiers et al. |
| 2006/0032175 A1 | 2/2006 | Chen et al. |
| 2006/0032177 A1* | 2/2006 | Moriau ............ E04F 15/02038 52/592.1 |
| 2006/0062966 A1 | 3/2006 | Kang et al. |
| 2006/0064940 A1 | 3/2006 | Cappelle |
| 2006/0075713 A1 | 4/2006 | Pervan et al. |
| 2006/0156670 A1 | 7/2006 | Knauseder |
| 2006/0174578 A1* | 8/2006 | Konstanczak .......... E04F 15/10 52/589.1 |
| 2006/0179773 A1 | 8/2006 | Pervan |
| 2006/0196138 A1 | 9/2006 | Moriau et al. |
| 2006/0201095 A1 | 9/2006 | Moriau et al. |
| 2006/0204773 A1 | 9/2006 | Kwon et al. |
| 2006/0225370 A1 | 10/2006 | Moriau et al. |
| 2006/0225377 A1 | 10/2006 | Moriau et al. |
| 2006/0236630 A1 | 10/2006 | Moriau et al. |
| 2006/0236631 A1 | 10/2006 | Moriau et al. |
| 2006/0236632 A1 | 10/2006 | Moriau et al. |
| 2006/0236633 A1 | 10/2006 | Moriau et al. |
| 2006/0236634 A1 | 10/2006 | Moriau et al. |
| 2006/0236635 A1 | 10/2006 | Moriau et al. |
| 2006/0236636 A1 | 10/2006 | Moriau et al. |
| 2006/0236637 A1 | 10/2006 | Moriau et al. |
| 2006/0236638 A1 | 10/2006 | Moriau et al. |
| 2006/0236643 A1 | 10/2006 | Moriau et al. |
| 2006/0248829 A1 | 11/2006 | Moriau et al. |
| 2006/0248830 A1 | 11/2006 | Moriau et al. |
| 2006/0248831 A1 | 11/2006 | Moriau et al. |
| 2006/0254183 A1 | 11/2006 | Moriau et al. |
| 2006/0254184 A1 | 11/2006 | Moriau et al. |
| 2006/0254185 A1 | 11/2006 | Moriau et al. |
| 2006/0260249 A1 | 11/2006 | Moriau et al. |
| 2006/0272263 A1 | 12/2006 | Moriau et al. |
| 2006/0280870 A1 | 12/2006 | Halot et al. |
| 2007/0006543 A1 | 1/2007 | Engstrom |
| 2007/0051064 A1 | 3/2007 | Thiers |
| 2007/0094978 A1 | 5/2007 | Svanholm et al. |
| 2007/0094986 A1 | 5/2007 | Moriau et al. |
| 2007/0094987 A1 | 5/2007 | Moriau et al. |
| 2007/0107360 A1 | 5/2007 | Moriau et al. |
| 2007/0107363 A1 | 5/2007 | Moriau et al. |
| 2007/0125021 A1 | 6/2007 | Thiers et al. |
| 2007/0141316 A1 | 6/2007 | McGrath et al. |
| 2007/0151189 A1 | 7/2007 | Yang |
| 2007/0175148 A1 | 8/2007 | Bergelin et al. |
| 2007/0175160 A1 | 8/2007 | Groeke et al. |
| 2007/0193178 A1 | 8/2007 | Groeke et al. |
| 2007/0202314 A1 | 8/2007 | Youn et al. |
| 2007/0251188 A1 | 11/2007 | Moriau et al. |
| 2007/0254175 A1* | 11/2007 | Song ...................... D06N 3/183 428/500 |
| 2007/0266666 A1 | 11/2007 | Dammers |
| 2007/0294968 A1 | 12/2007 | Braun |
| 2008/0000183 A1 | 1/2008 | Bergelin et al. |
| 2008/0000186 A1 | 1/2008 | Pervan et al. |
| 2008/0005999 A1 | 1/2008 | Pervan |
| 2008/0010928 A1 | 1/2008 | Moriau et al. |
| 2008/0010929 A1 | 1/2008 | Moriau et al. |
| 2008/0010931 A1 | 1/2008 | Pervan et al. |
| 2008/0010938 A1 | 1/2008 | Hannig |
| 2008/0029926 A1 | 2/2008 | Steinwender et al. |
| 2008/0034701 A1 | 2/2008 | Pervan |
| 2008/0053027 A1 | 3/2008 | Moriau et al. |
| 2008/0053028 A1 | 3/2008 | Moriau et al. |
| 2008/0060308 A1 | 3/2008 | Pervan et al. |
| 2008/0060309 A1 | 3/2008 | Moriau et al. |
| 2008/0060310 A1 | 3/2008 | Moriau et al. |
| 2008/0060311 A1 | 3/2008 | Moriau et al. |
| 2008/0066416 A1 | 3/2008 | Moriau et al. |
| 2008/0078181 A1 | 4/2008 | Mueller et al. |
| 2008/0107841 A1 | 5/2008 | Remillard et al. |
| 2008/0118713 A1 | 5/2008 | Bordener |
| 2008/0134607 A1 | 6/2008 | Pervan et al. |

(56) References Cited

U.S. PATENT DOCUMENTS

| | | |
|---|---|---|
| 2008/0134613 A1 | 6/2008 | Pervan |
| 2008/0134614 A1 | 6/2008 | Pervan et al. |
| 2008/0138560 A1* | 6/2008 | Windmoller ............. B32B 3/02 428/46 |
| 2008/0152825 A1 | 6/2008 | Mukai et al. |
| 2008/0168737 A1 | 7/2008 | Pervan |
| 2008/0172856 A1 | 7/2008 | Brouckaert et al. |
| 2008/0295432 A1 | 12/2008 | Pervan et al. |
| 2008/0295438 A1 | 12/2008 | Knauseder |
| 2008/0295958 A1 | 12/2008 | Tsujimoto et al. |
| 2008/0305312 A1 | 12/2008 | Kim et al. |
| 2008/0311355 A1 | 12/2008 | Chen et al. |
| 2009/0019801 A1 | 1/2009 | Coghlan et al. |
| 2009/0019806 A1 | 1/2009 | Muehlebach |
| 2009/0019808 A1 | 1/2009 | Palsson et al. |
| 2009/0031662 A1 | 2/2009 | Chen et al. |
| 2009/0042010 A1 | 2/2009 | Stanhope |
| 2009/0047465 A1 | 2/2009 | Zafiroglu |
| 2009/0061168 A1* | 3/2009 | Kim ..................... B32B 27/304 428/195.1 |
| 2009/0064624 A1 | 3/2009 | Sokol |
| 2009/0100782 A1 | 4/2009 | Groeke et al. |
| 2009/0133353 A1 | 5/2009 | Pervan et al. |
| 2009/0133358 A1 | 5/2009 | Hecht |
| 2009/0139170 A1 | 6/2009 | Thiers |
| 2009/0151290 A1 | 6/2009 | Liu |
| 2009/0155612 A1* | 6/2009 | Pervan ................... B32B 21/02 428/498 |
| 2009/0173032 A1 | 7/2009 | Prager et al. |
| 2009/0193741 A1* | 8/2009 | Cappelle .......... E04F 15/02033 52/309.1 |
| 2009/0217615 A1 | 9/2009 | Engstrom |
| 2009/0223162 A1* | 9/2009 | Chen ..................... E04F 15/02 52/588.1 |
| 2009/0226662 A1 | 9/2009 | Dyczko-Riglin et al. |
| 2009/0260307 A1* | 10/2009 | Thiers ....................... B44C 1/24 52/309.1 |
| 2009/0260313 A1 | 10/2009 | Segaert |
| 2009/0269522 A1 | 10/2009 | Liu |
| 2009/0320402 A1 | 12/2009 | Schacht et al. |
| 2010/0015420 A1* | 1/2010 | Riebel .................... B32B 21/02 428/203 |
| 2010/0018149 A1 | 1/2010 | Thiers |
| 2010/0037550 A1 | 2/2010 | Braun |
| 2010/0043333 A1 | 2/2010 | Hannig |
| 2010/0055420 A1 | 3/2010 | Vermeulen |
| 2010/0058590 A1 | 3/2010 | Braun et al. |
| 2010/0083603 A1* | 4/2010 | Goodwin ............... F16B 5/0056 52/589.1 |
| 2010/0115874 A1* | 5/2010 | Nilsson ..................... C09J 5/00 52/588.1 |
| 2010/0129609 A1 | 5/2010 | Thiagarajan et al. |
| 2010/0192793 A1 | 8/2010 | Verhaeghe |
| 2010/0218450 A1 | 9/2010 | Braun et al. |
| 2010/0281803 A1 | 11/2010 | Cappelle |
| 2010/0300029 A1 | 12/2010 | Braun et al. |
| 2010/0319292 A1 | 12/2010 | Moriau et al. |
| 2011/0023405 A1 | 2/2011 | Moriau et al. |
| 2011/0056167 A1 | 3/2011 | Nilsson |
| 2011/0088346 A1 | 4/2011 | Hannig |
| 2011/0138722 A1 | 6/2011 | Hannig |
| 2011/0154763 A1 | 6/2011 | Bergelin et al. |
| 2011/0162312 A1 | 7/2011 | Schulte |
| 2011/0162777 A1 | 7/2011 | Youn et al. |
| 2011/0225921 A1 | 9/2011 | Schulte |
| 2011/0225922 A1 | 9/2011 | Pervan et al. |
| 2011/0268937 A1 | 11/2011 | Schacht et al. |
| 2011/0271632 A1 | 11/2011 | Cappelle et al. |
| 2011/0300392 A1 | 12/2011 | Vermeulen |
| 2011/0308182 A1 | 12/2011 | Downey |
| 2012/0011796 A1 | 1/2012 | Hannig |
| 2012/0015107 A1 | 1/2012 | Schacht et al. |
| 2012/0055112 A1 | 3/2012 | Engstrom |
| 2012/0067461 A1 | 3/2012 | Braun |
| 2012/0124932 A1 | 5/2012 | Schulte et al. |
| 2012/0174519 A1 | 7/2012 | Schulte |
| 2012/0174521 A1 | 7/2012 | Schulte |
| 2012/0213973 A1* | 8/2012 | Clement ................ B44C 5/043 428/161 |
| 2012/0266555 A1 | 10/2012 | Cappelle |
| 2012/0279154 A1 | 11/2012 | Bergelin et al. |
| 2013/0008118 A1 | 1/2013 | Baert et al. |
| 2013/0008127 A1 | 1/2013 | Braun et al. |
| 2013/0036695 A1 | 2/2013 | Durnberger |
| 2013/0042558 A1 | 2/2013 | Cordeiro |
| 2013/0062006 A1 | 3/2013 | Meersseman et al. |
| 2013/0067842 A1 | 3/2013 | Meersseman et al. |
| 2013/0081349 A1 | 4/2013 | Pervan et al. |
| 2013/0104487 A1 | 5/2013 | Moriau et al. |
| 2013/0295352 A1 | 11/2013 | Thiers et al. |
| 2013/0298487 A1 | 11/2013 | Bergelin et al. |
| 2013/0305649 A1 | 11/2013 | Thiers |
| 2014/0020820 A1 | 1/2014 | Meersseman et al. |
| 2014/0033635 A1 | 2/2014 | Pervan et al. |
| 2014/0033636 A1 | 2/2014 | Cappelle |
| 2014/0053497 A1 | 2/2014 | Pervan et al. |
| 2014/0130437 A1 | 5/2014 | Cappelle |
| 2014/0150369 A1 | 6/2014 | Hannig |
| 2014/0255659 A1 | 9/2014 | Windmöller |
| 2014/0290174 A1 | 10/2014 | Moriau et al. |
| 2014/0318070 A1 | 10/2014 | Schacht et al. |
| 2015/0167317 A1 | 6/2015 | Cappelle |
| 2015/0204080 A1 | 7/2015 | Cappelle |
| 2015/0204081 A1 | 7/2015 | Cappelle |
| 2015/0211238 A1 | 7/2015 | Moriau et al. |
| 2016/0046144 A1 | 2/2016 | Thiers |
| 2016/0069089 A1 | 3/2016 | Bergelin et al. |
| 2016/0193857 A1 | 7/2016 | De Mondt et al. |
| 2016/0215505 A1 | 7/2016 | Cappelle et al. |
| 2016/0251861 A1 | 9/2016 | Cappelle |
| 2016/0265233 A1 | 9/2016 | Cappelle |
| 2017/0051514 A1 | 2/2017 | Cappelle |
| 2017/0089078 A1 | 3/2017 | Schacht et al. |
| 2017/0284106 A1 | 10/2017 | Cappelle |
| 2017/0335571 A1 | 11/2017 | Hannig |
| 2017/0350140 A1 | 12/2017 | Bergelin et al. |
| 2018/0127985 A1 | 5/2018 | Cappelle |
| 2018/0223540 A1 | 8/2018 | Cappelle |
| 2019/0048595 A1 | 2/2019 | Cappelle |
| 2019/0093370 A1 | 3/2019 | Pervan et al. |
| 2019/0330858 A1 | 10/2019 | Cappelle |
| 2020/0063444 A1 | 2/2020 | Cappelle |

FOREIGN PATENT DOCUMENTS

| | | |
|---|---|---|
| CA | 1237344 A | 5/1988 |
| CA | 2226286 A1 | 12/1997 |
| CA | 2734801 A1 | 3/2010 |
| CN | 2110047 U | 7/1992 |
| CN | 1119152 A | 3/1996 |
| CN | 2301491 Y | 12/1998 |
| CN | 1239174 A | 12/1999 |
| CN | 2364121 Y | 2/2000 |
| CN | 2415082 Y | 1/2001 |
| CN | 1361844 A | 7/2002 |
| CN | 1399051 A | 2/2003 |
| CN | 2536701 Y | 2/2003 |
| CN | 2536704 Y | 2/2003 |
| CN | 2654757 Y | 11/2004 |
| CN | 2688807 Y | 3/2005 |
| CN | 2705574 Y | 6/2005 |
| CN | 2880971 Y | 3/2007 |
| CN | 101023230 A | 8/2007 |
| CN | 101042014 A | 9/2007 |
| CN | 101072691 A | 11/2007 |
| CN | 100354492 C | 12/2007 |
| CN | 101158226 A | 4/2008 |
| CN | 101168610 A | 4/2008 |
| CN | 201071580 Y | 6/2008 |
| CN | 101300142 A | 11/2008 |
| CN | 101368440 A | 2/2009 |
| CN | 101376277 A | 3/2009 |
| CN | 101397840 A | 4/2009 |

(56) References Cited

FOREIGN PATENT DOCUMENTS

| | | |
|---|---|---|
| CN | 101460688 A | 6/2009 |
| CN | 201268019 Y | 7/2009 |
| CN | 100523404 C | 8/2009 |
| CN | 101529032 A | 9/2009 |
| CN | 101544005 A | 9/2009 |
| CN | 101544082 A | 9/2009 |
| CN | 101545314 A | 9/2009 |
| CN | 101563511 A | 10/2009 |
| CN | 101629446 A | 1/2010 |
| CN | 201381624 Y | 1/2010 |
| CN | 201679203 U | 12/2010 |
| CN | 202483139 U | 10/2012 |
| DE | 254920 C | 12/1912 |
| DE | 1534802 A1 | 4/1970 |
| DE | 2545854 A1 | 10/1976 |
| DE | 2721292 A1 | 11/1978 |
| DE | 2856391 A1 | 7/1980 |
| DE | 254920 A1 | 3/1988 |
| DE | 19532819 A1 | 3/1997 |
| DE | 19725829 C1 | 8/1998 |
| DE | 20002744 U1 | 8/2000 |
| DE | 19944399 A1 | 4/2001 |
| DE | 20206751 U1 | 8/2002 |
| DE | 10138285 A1 | 3/2003 |
| DE | 20300306 U1 | 4/2003 |
| DE | 10154767 A1 | 5/2003 |
| DE | 20300291 U1 | 11/2003 |
| DE | 10237397 A1 | 2/2004 |
| DE | 10230818 B3 | 3/2004 |
| DE | 102004055951 A1 | 7/2005 |
| DE | 102005002297 A1 | 8/2005 |
| DE | 102004009160 A1 | 9/2005 |
| DE | 102004023157 A1 | 11/2005 |
| DE | 202005019427 U1 | 4/2006 |
| DE | 202007000310 U1 | 4/2007 |
| DE | 102006054023 A1 | 12/2007 |
| DE | 102007018309 A1 | 8/2008 |
| DE | 202008008597 U1 | 8/2008 |
| DE | 102007015907 A1 | 10/2008 |
| DE | 202008011589 U1 | 11/2008 |
| DE | 102007026342 A1 | 1/2009 |
| DE | 102007032885 A1 | 1/2009 |
| DE | 102007035648 A1 | 1/2009 |
| DE | 102007042250 A1 | 3/2009 |
| DE | 102007043308 A1 | 3/2009 |
| DE | 202009004530 U1 | 6/2009 |
| DE | 102007062430 B3 | 7/2009 |
| DE | 102008003550 A1 | 7/2009 |
| DE | 102008022511 A1 | 10/2009 |
| DE | 102008021970 A1 | 11/2009 |
| DE | 102008003117 A1 | 12/2009 |
| DE | 102009038750 A1 | 3/2011 |
| DE | 102010022290 A1 | 12/2011 |
| DE | 102010023922 A1 | 12/2011 |
| EP | 0007230 A2 | 1/1980 |
| EP | 0130559 A2 | 1/1985 |
| EP | 0270291 A1 | 6/1988 |
| EP | 0562402 A1 | 9/1993 |
| EP | 0843763 A1 | 5/1998 |
| EP | 0864712 A2 | 9/1998 |
| EP | 0903451 A2 | 3/1999 |
| EP | 0974713 A1 | 1/2000 |
| EP | 1026341 A2 | 8/2000 |
| EP | 1138467 A1 | 10/2001 |
| EP | 1154090 A1 | 11/2001 |
| EP | 1229182 A1 | 8/2002 |
| EP | 1247641 A1 | 10/2002 |
| EP | 1262607 A1 | 12/2002 |
| EP | 1262609 A1 | 12/2002 |
| EP | 1420125 A2 | 5/2004 |
| EP | 1454763 A2 | 9/2004 |
| EP | 1469140 A1 | 10/2004 |
| EP | 1493879 A1 | 1/2005 |
| EP | 1593796 A1 | 11/2005 |
| EP | 1624130 A2 | 2/2006 |
| EP | 1650375 A1 | 4/2006 |
| EP | 1705309 A2 | 9/2006 |
| EP | 1707705 A2 | 10/2006 |
| EP | 1808546 A1 | 7/2007 |
| EP | 1818478 A1 | 8/2007 |
| EP | 1872959 A1 | 1/2008 |
| EP | 1892352 A2 | 2/2008 |
| EP | 1938963 A1 | 7/2008 |
| EP | 2063044 A1 | 5/2009 |
| EP | 2130991 A2 | 12/2009 |
| EP | 1290290 B1 | 1/2010 |
| EP | 2333195 A1 | 6/2011 |
| EP | 2390437 A2 | 11/2011 |
| FR | 2149112 A5 | 3/1973 |
| FR | 2271365 A1 | 12/1975 |
| FR | 2609664 A1 | 7/1988 |
| FR | 2827529 A1 | 1/2003 |
| GB | 900958 A | 7/1962 |
| GB | 1015701 A | 1/1966 |
| GB | 1364685 A | 8/1974 |
| GB | 1467899 A | 3/1977 |
| GB | 1520964 A | 8/1978 |
| GB | 2020998 A | 11/1979 |
| GB | 2145371 A | 3/1985 |
| GB | 2202184 A | 9/1988 |
| GB | 2376916 A | 12/2002 |
| JP | S60255843 A | 12/1985 |
| JP | S62127225 A | 6/1987 |
| JP | H03110258 A | 5/1991 |
| JP | 103169967 A | 7/1991 |
| JP | 105018028 A | 1/1993 |
| JP | H05214803 A | 8/1993 |
| JP | H0664108 A | 3/1994 |
| JP | H07180333 A | 7/1995 |
| JP | 2000170361 A | 6/2000 |
| JP | 2001096706 A | 4/2001 |
| KR | 960005785 Y1 | 7/1996 |
| KR | 19990036219 A | 5/1999 |
| KR | 19990036219 U | 5/1999 |
| KR | 20030050167 A | 6/2003 |
| KR | 20040000297 A | 1/2004 |
| KR | 20060004828 A | 1/2006 |
| KR | 20060045871 A | 5/2006 |
| KR | 20080069896 A | 7/2008 |
| NL | 8000083 A | 8/1981 |
| WO | 9511333 A1 | 4/1995 |
| WO | 9627721 A1 | 9/1996 |
| WO | 9718949 A1 | 5/1997 |
| WO | 9747824 A1 | 12/1997 |
| WO | 9747834 A1 | 12/1997 |
| WO | 9917930 A1 | 4/1999 |
| WO | 9945060 A1 | 9/1999 |
| WO | 0020705 A1 | 4/2000 |
| WO | 0020706 A1 | 4/2000 |
| WO | 0047841 A1 | 8/2000 |
| WO | 0109461 A1 | 2/2001 |
| WO | 0147724 A1 | 7/2001 |
| WO | 0147725 A1 | 7/2001 |
| WO | 0148333 A1 | 7/2001 |
| WO | 0151732 A1 | 7/2001 |
| WO | 0166877 A1 | 9/2001 |
| WO | 0175247 A1 | 10/2001 |
| WO | 0183488 A1 | 11/2001 |
| WO | 0196689 A1 | 12/2001 |
| WO | 0198604 A1 | 12/2001 |
| WO | 0200449 A1 | 1/2002 |
| WO | 0204206 A1 | 1/2002 |
| WO | 02060702 A2 | 8/2002 |
| WO | 03012224 A1 | 2/2003 |
| WO | 03016654 A1 | 2/2003 |
| WO | 03084746 A1 | 10/2003 |
| WO | 03087497 A1 | 10/2003 |
| WO | 03089736 A1 | 10/2003 |
| WO | 2004003314 A1 | 1/2004 |
| WO | 2004015221 A1 | 2/2004 |
| WO | 2004042168 A1 | 5/2004 |
| WO | 2004048716 A1 | 6/2004 |
| WO | 2004050359 A1 | 6/2004 |
| WO | 2004081316 A1 | 9/2004 |

(56) References Cited

FOREIGN PATENT DOCUMENTS

| WO | 2005003489 A1 | 1/2005 |
|---|---|---|
| WO | 2005018833 A1 | 3/2005 |
| WO | 2005033204 A1 | 4/2005 |
| WO | 2005054599 A1 | 6/2005 |
| WO | 2006032378 A1 | 3/2006 |
| WO | 2006033706 A1 | 3/2006 |
| WO | 2006043893 A1 | 4/2006 |
| WO | 2006066776 A2 | 6/2006 |
| WO | 2006090287 A1 | 8/2006 |
| WO | 2006103565 A2 | 10/2006 |
| WO | 2006104436 A1 | 10/2006 |
| WO | 2007015669 A2 | 2/2007 |
| WO | 2007047834 A2 | 4/2007 |
| WO | 2007059967 A1 | 5/2007 |
| WO | 2007078181 A1 | 7/2007 |
| WO | 2007079845 A1 | 7/2007 |
| WO | 2007081267 A1 | 7/2007 |
| WO | 2007113676 A2 | 10/2007 |
| WO | 2007141605 A2 | 12/2007 |
| WO | 2008004960 A2 | 1/2008 |
| WO | 2008017281 A1 | 2/2008 |
| WO | 2008060232 A1 | 5/2008 |
| WO | 2008068245 A1 | 6/2008 |
| WO | 2008078181 A1 | 7/2008 |
| WO | 2008083662 A1 | 7/2008 |
| WO | 2008091045 A1 | 7/2008 |
| WO | 2008116623 A1 | 10/2008 |
| WO | 2008119339 A1 | 10/2008 |
| WO | 2009021487 A1 | 2/2009 |
| WO | 2009033623 A1 | 3/2009 |
| WO | 2009061279 A1 | 5/2009 |
| WO | 2009065769 A2 | 5/2009 |
| WO | 2009066153 A2 | 5/2009 |
| WO | 2009116926 A1 | 9/2009 |
| WO | 2009118709 A2 | 10/2009 |
| WO | 2009139687 A1 | 11/2009 |
| WO | 2010023042 A1 | 3/2010 |
| WO | 2010028621 A1 | 3/2010 |
| WO | 2010042182 A1 | 4/2010 |
| WO | 2010075839 A1 | 7/2010 |
| WO | 2010082171 A2 | 7/2010 |
| WO | 2010087752 A1 | 8/2010 |
| WO | 2010088769 A1 | 8/2010 |
| WO | 2010102735 A1 | 9/2010 |
| WO | 2010108980 A1 | 9/2010 |
| WO | 2010142671 A1 | 12/2010 |
| WO | 2011001326 A2 | 1/2011 |
| WO | 2011012104 A2 | 2/2011 |
| WO | 2011012105 A1 | 2/2011 |
| WO | 2011028171 A1 | 3/2011 |
| WO | 2011061659 A2 | 5/2011 |
| WO | 2011085306 A1 | 7/2011 |
| WO | 2011085788 A1 | 7/2011 |
| WO | 2011085825 A1 | 7/2011 |
| WO | 2011087425 A1 | 7/2011 |
| WO | 2011096879 A1 | 8/2011 |
| WO | 2011127981 A1 | 10/2011 |
| WO | 2011141043 A1 | 11/2011 |
| WO | 2012001091 A1 | 1/2012 |
| WO | 2012001109 A1 | 1/2012 |
| WO | 2012004700 A2 | 1/2012 |

OTHER PUBLICATIONS

Search Report and Written Opinion from corresponding EP Application No. EP16186084, dated Nov. 23, 2016.
Search Report from corresponding CN Application No. 201510587784, dated Jan. 17, 2017.
Search Report and Written Opinion from corresponding EP Application No. EP17192468, dated Feb. 5, 2018.
Search Report and Written Opinion from corresponding EP Application No. EP17192992, dated Feb. 26, 2018.
Search Report and Written Opinion from corresponding EP Application No. EP17193145, dated Feb. 26, 2018.
Search Report and Written Opinion from corresponding EP Application No. EP17192967, dated Mar. 2, 2018.
Search Report and Written Opinion from corresponding EP Application No. EP18195393, dated Jan. 23, 2019.
Search Report from corresponding EP Application No. EP09015855, dated May 25, 2010.
Search Report from corresponding BE Application No. BE201000420, dated Feb. 15, 2011.
Search Report from corresponding BE Application No. BE201000749, dated Mar. 25, 2011.
Search Report from corresponding BE Application No. BE201000705, dated May 23, 2011.
Search Report from corresponding BE Application No. BE201000713, dated Jun. 14, 2011.
Search Report from corresponding PCT Application No. PCT/IB2010/055693, dated Jun. 24, 2011.
Search Report from corresponding BE Application No. BE20110719, dated Sep. 27, 2011.
Search Report from corresponding BE Application No. BE20110247, dated Sep. 28, 2011.
Search Report from corresponding PCT Application No. PCT/IB2011/051886, dated Feb. 21, 2012.
Search Report from corresponding PCT Application No. PCT/IB2011/054223, dated May 23, 2012.
Search Report from corresponding BE Application No. 201100418, dated Jun. 11, 2012.
Search Report from corresponding PCT Application No. PCT/IB2011/052714, dated Jun. 11, 2012.
Search Report from corresponding BE Application No. BE201100128, dated Jun. 19, 2012.
Search Report from corresponding PCT Application No. PCT/IB2011/052713, dated Jun. 22, 2012.
Search Report from corresponding PCT Application No. PCT/IB2011/052715, dated Aug. 21, 2012.
Search Report from corresponding PCT Application No. PCT/IB2011/051523, dated Sep. 24, 2012.
Search Report from corresponding BE Application No. BE201000602, dated Nov. 9, 2012.
International Preliminary Report on Patentability from PCT Application No. PCT/IB2011/051885, dated Nov. 13, 2012.
International Preliminary Report on Patentability from PCT Application No. PCT/IB2011/051884, dated Nov. 13, 2012.
International Preliminary Report on Patentability from PCT Application No. PCT/IB2011/051886, dated Nov. 13, 2012.
Search Report from corresponding PCT Application No. PCT/IB2011/051884, dated Nov. 22, 2011.
International Preliminary Report on Patentability from PCT Application No. PCT/IB2011/051523, dated Jan. 15, 2013.
International Preliminary Report on Patentability from PCT Application No. PCT/IB2011/052713, dated Jan. 15, 2013.
International Preliminary Report on Patentability from PCT Application No. PCT/IB2011/052714, dated Jan. 15, 2013.
International Preliminary Report on Patentability from PCT Application No. PCT/IB2011/052715, dated Jan. 15, 2013.
International Preliminary Report on Patentability from PCT Application No. PCT/IB2011/054223, dated Apr. 16, 2013.
Search Report from corresponding CN Application No. 2011800231833, dated Feb. 19, 2014.
Search Report from corresponding CN Application No. 2011800237219, dated Mar. 10, 2014.
Search Report from corresponding CN Application No. 2011800341072, dated Jul. 23, 2014.
Supplementary Search Report from corresponding CN Application No. 2011800231833, dated Aug. 6, 2014.
Supplementary Search Report from corresponding CN Application No. 2011800237219, dated Oct. 15, 2014.
Supplementary Search Report from corresponding CN Application No. 2011800237219, dated Jan. 9, 2015.
Supplementary Search Report from corresponding CN Application No. 2011800237219, dated May 28, 2015.
Search Report and Written Opinion from corresponding EP Application No. 16184900, dated Nov. 1, 2016.

(56) References Cited

OTHER PUBLICATIONS

Search Report from corresponding CN Application No. 201505878943, dated Jan. 16, 2017.
Search Report from corresponding CN Application No. 2015106053134, dated Mar. 24, 2017.
Search Report from corresponding CN Application No. 201510618221, dated Mar. 22, 2017.
Search Report and Written Opinion from corresponding EP Application No. EP17192481, dated Jan. 23, 2018.
Search Report from corresponding EP Application No. EP18152924, dated Apr. 20, 2018.
Search Report from corresponding PCT Application No. PCT/IB2011/051885, dated Feb. 9, 2020.
Search Report and Written Opinion from corresponding EP Application No. EP09015885, dated May 25, 2010.
Search Report from corresponding BE Application No. BE201000719, dated Sep. 27, 2011.
Search Report from corresponding BE Application No. BE201100247, dated Sep. 28, 2011.
International Preliminary Report on Patentability from corresponding PCT Application No. PCT/IB2010/055693, dated Jun. 26, 2012.
Search Report from corresponding CN Application No. 201080063498, dated Jan. 6, 2014.
Search Report from corresponding CN Application No. 2015101886353, dated Aug. 1, 2016.
Search Report from corresponding CN Application No. 2015101885153, dated Aug. 19, 2016.
Search Report from corresponding CN Application No. 20151018855562, dated Aug. 19, 2016.
Search Report from corresponding CN Application No. 2015101878249, dated Aug. 22, 2016.
Search Report from corresponding CN Application No. 2015101885346, dated Sep. 1, 2016.
Search Report from corresponding CN Application No. 2015101876968, dated Oct. 17, 2016.
Search Report from corresponding CN Application No. 2015101882070, dated Oct. 18, 2016.
Supplementary Search Report from corresponding CN Application No. 2015101885562, dated Mar. 29, 2017.
Supplementary Search Report from corresponding CN Application No. 2015101882070, dated May 26, 2017.
Supplementary Search Report from corresponding CN Application No. 2015101885153, dated May 31, 2017.
Supplementary Search Report from corresponding CN Application No. 2015101882070, dated Aug. 2, 2017.
Supplementary Search Report from corresponding CN Application No. 2015101876968, dated Jan. 2, 2018.
Supplementary Search Report from corresponding CN Application No. 2015101878249, dated Feb. 7, 2018.
Supplementary Search Report from corresponding CN Application No. 2015101876968, dated Apr. 15, 2018.
Search Report and Written Opinion from corresponding EP Application No. EP19175669, dated Sep. 26, 2019.
Chang et al., Product Review: "Advances in Polyurethane Coatings (1969 to Early 1972)", Industrial & Engineering Chemistry Product Research & Development, vol. 12, No. 4, pp. 278-288, Sep. 7, 1973.
An et al., "Building and Ornament Materials," China Architecture & Buildingpress, Feb. 2005, pp. 111-114.
Zhong, "Building Plastic," China Petrochemical Press, Jan. 2007, 6 Pages.
WPI Database week 199338 Thomson Scientific, Lodon, GB; AN 1993-300138 XP002621436, 1 page, Feb. 16, 2011 08:59:55.

\* cited by examiner

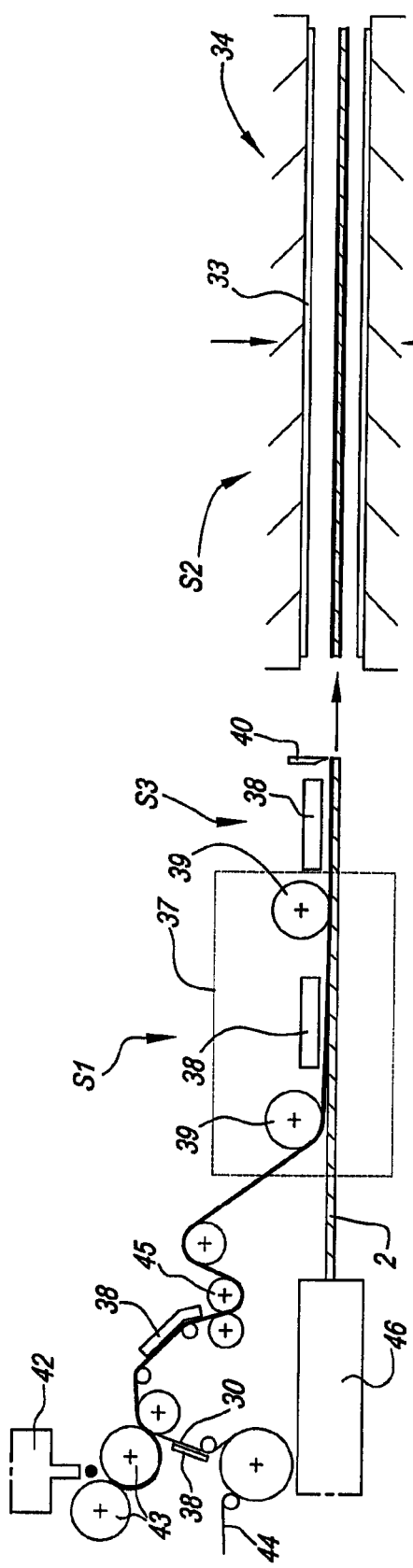
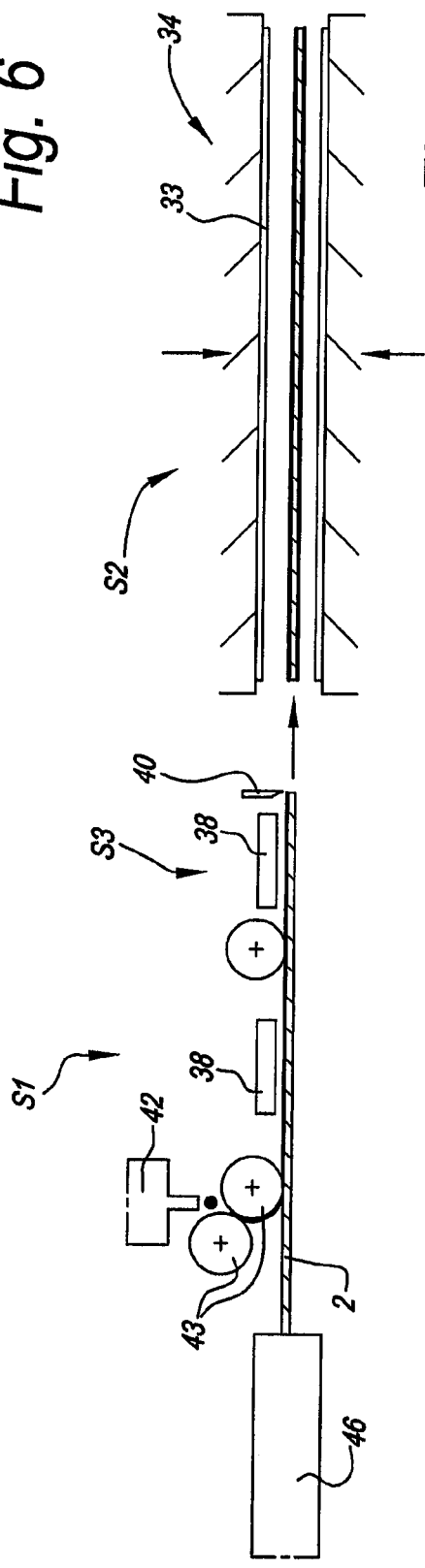

FLOOR PANEL

This application is a continuation application of U.S. patent application Ser. No. 15/695,163, filed Sep. 5, 2017, which is a continuation of U.S. patent application Ser. No. 15/045,389 filed Feb. 17, 2016, now U.S. Pat. No. 9,783,995 issued Oct. 10, 2017, which is a continuation application of U.S. patent application Ser. No. 14/015,307 filed Aug. 30, 2013, now U.S. Pat. No. 9,322,184 issued Apr. 26, 2016, which is a divisional application of U.S. patent application Ser. No. 13/696,769 filed Nov. 7, 2012, now U.S. Pat. No. 8,549,807 issued Oct. 8, 2013, which is a US National Phase application of International Application No. PCT/IB2011/051884 filed Apr. 28, 2011, the entire content of all which are incorporated herein by reference.

This application claims priority under 35 USC § 119(a)-(d) to Belgian Patent Application No. 2010/0283 filed May 10, 2010, the entire content of which is incorporated herein by reference.

BACKGROUND

1. Field

This invention relates to floor panels and methods for manufacturing floor panels.

More particularly, the invention relates to floor panels of the type which is at least composed of a substrate and a top layer provided on this substrate, wherein said top layer comprises a motif. As known, above said motif a transparent or translucent synthetic material layer can be provided, which layer then forms part of said top layer.

In particular, the present invention relates to floor panels of the type which, at two or more opposite edges, comprises coupling means or coupling parts, with which two of such floor panels can be coupled at the respective edges, such that they are locked together in a horizontal direction perpendicular to the respective edge the floor panels, as well as in a vertical direction perpendicular to the plane of the floor panels. Such floor panels can be applied for composing a so-called floating floor covering, wherein the floor panels are interconnected at their edges, however, are lying freely on the underlying floor.

2. Related Art

From WO 97/47834, laminate floor panels are known for forming a floating floor covering. However, laminate floor panels show the disadvantage that they mostly are provided with a moisture-sensitive substrate, namely MDF or HDF (Medium Density Fiberboard or High Density Fiberboard), and that the top layer provided on said substrate, when the floor covering is in use, leads to the development of ticking noises. Mostly, laminate floor panels have a thickness situated between 6 and 12 millimeters, wherein the thickness of the top layer mostly is less than 0.5 millimeters. Moreover, the high density of the substrate material leads to high impact sensitivity.

From EP 1 290 290, it is known to provide laminate floor panels with a structured surface, for example, with a structure imitating wood pores. According to EP 1 290 290, such structure can be provided by means of a press device of the short-cycle type and an associated structured press element or press platen. Herein, the structure can be provided in such a manner that it corresponds to the pattern of the laminate floor panels.

From EP 1 938 963, vinyl-based floor panels are known for forming such floating floor covering. Such vinyl-based floor panels mostly have a thickness of 3 to 5 millimeters and have a high material density. Inherent to these floor panels is their limited bending stiffness and their high deformability. These features lead to problems when the floor panels are applied on an uneven underlying surface. Namely, after a certain period of time the unevennesses of the underlying surface may migrate to the surface of the floor covering. With a local load, for example, underneath the legs of tables or chairs, permanent impressions will occur, which are undesired as well. Such floor panels also lead to problems with the propagation of sound towards underlying rooms.

SUMMARY

The present invention relates to an alternative panel, which in particular is intended as a floor panel for forming a floating floor covering. According to various preferred embodiments of the invention, also a solution is offered for one or more problems with the floor panels of the state of the art.

To this aim, the invention, according to its first independent aspect, relates to a floor panel of the type which comprises at least a substrate and a top layer provided thereon, wherein said top layer comprises a motif, with the characteristic that said substrate substantially consists of a foamed synthetic material layer, which preferably has an average density of more than 300 kilograms per cubic meter. In that a foamed synthetic material layer is applied, a less moisture-sensitive floor panel is obtained than in the case of an MDF or HDF substrate. By foaming, with a comparable amount of synthetic material as with the floor panels of EP 1 938 963, a thicker and stiffer substrate is obtained, such that the risk of the occurrence of migration effects from the underlying layer to the surface of the floor covering can be minimized. This is in particular the case when an average density is applied of more than 300 kilograms per cubic meter. Said substrate preferably has a thickness of more than five millimeters. With such thickness of the substrate, the risk of the occurrence of said migration effects is minimized even further. The minimum thickness of five millimeters also allows that sturdy mechanical coupling means can be formed in one piece with the synthetic material board, for example, in that those can be provided at least partially directly in the synthetic material board as milled profiles.

The preferred minimum average density of the foamed synthetic material board is also advantageous when providing, more particularly milling, the profiles and can result in coupling means offering a strong vertical and/or horizontal locking. With said minimum density, it is avoided that the edges of the synthetic material board are deformed too much. Boards of a lower density namely have a higher risk of pushing up the edges, wherein such pushed-up edges will protrude above the actual board surface. Such effect is undesired. Another advantage of said minimum density is that it results in a better resistance against local loads.

Preferably, said synthetic material board has an average density of 450 to 900 kilograms per cubic meter, preferably 500 to 600 kilograms per cubic meter. It is clear that the above-mentioned advantages of the preferred minimum density are more pronounced with a higher density of the foamed board material. However, too high a density will lead to disadvantageous effects, such as high impact sensitivity and increased sensitivity for possible unevennesses in the underlying surface, whereby sound boxes can be created, which effect an amplification of possible sound developed during the use of the floor covering.

Preferably, said synthetic material board has a local density on one or both flat sides which is higher than in a central layer of the foamed synthetic material board. With such construction, an optimal combination of an average low density and sufficient dimensional stiffness can be obtained. The locally higher density, preferably at least 5 or 10 percent higher than the average density, of course can be situated on the surface itself, as well as at a certain distance underneath the surface of the respective side, however, at a distance from a central layer of the substrate. In the cases where the locally higher density substantially is realized on one of both flat sides only, this preferably relates to the side of the substrate which is situated closest to said top layer. By means of such embodiment, the risk of the occurrence of permanent impressions can be minimized, while the floor panel as a whole has a low weight.

Preferably, said foamed synthetic material board relates to a foamed PVC (polyvinyl chloride) board, or a foamed synthetic material board which substantially consists of another vinyl compound, such as polyvinyl dichloride, polyvinyl butyrate, polyvinyl acetate and the like. As an alternative, as a basis material for the substrate use can also be made of melamine foam, polyurethane or polyisocyanurate.

According to a particular embodiment, said foamed synthetic material board is of the closed cell type, still better it relates to a closed cell foamed PVC board. It is known as such that with foamed synthetic material of the closed cell type the chambers of the foam practically are not interconnected, or at least to a much lesser extent than this is the case with foamed synthetic materials of the open cell type. A foamed synthetic material board of the closed cell type offers a very high stiffness, dimensional stability and water-resistance, with a limited density of, for example, 600 kilograms per cubic meter or less. The limited density offers interesting advantages in logistics, such as in transport. Also, the limited density offers a more ergonomic whole, when 5 to 10 of such floor panels are offered together in a packaging unit. It is clear that the present invention also relates to such packaging unit. The package applied therewith as such preferably consists at least of a cardboard box or open-top box, and shrink film. For example, the packaging materials can be applied which are known as such from WO 2006/103565.

As also mentioned above, an average density of the synthetic material board situated between 500 and 600 kilograms per cubic meter leads to an optimum result of all advantageous and disadvantageous effects. Such density can be realized by means of synthetic materials of the closed cell type, such contrary to the usual hard foams of the open cell type, for example, polyester hard foams or the hard foams known from U.S. Pat. No. 3,853,685, which have a density of 150 kilograms per cubic meter or less and typically are applied for cushions or mattresses.

According to another embodiment, said synthetic material board comprises separate layers which increase the bending stiffness thereof. Such layers preferably are situated at a distance of the center of said synthetic material board, preferably at both sides of this center. Such layers can consist, for example, of a glass fiber cloth or glass fiber fabric. Preferably, this particular embodiment is combined with a locally higher density on one or both flat sides, as also mentioned above.

Preferably, said top layer substantially consists of synthetic material. For example, said top layer can consist substantially of a vinyl compound or of a polyurethane compound. Preferably, said motif herein is formed by a printed synthetic material film, for example, a printed PVC film or a printed PUR (polyurethane) film. However, the invention does not exclude that the pattern can be formed in another manner, for example, by means of a print performed directly on said substrate, or on a primer layer provided on this substrate. The top layer preferably also includes a transparent or translucent layer based on synthetic material and situated above the motif, which layer is provided as a film, whether or not together with said printed film, or is provided in liquid form and subsequently is hardened on the substrate.

Preferably, the adherence between the top layer and the substrate is obtained in that these two are hardened against each other. For example, a top layer of synthetic material can be hardened on an already foamed synthetic material board or vice versa, or a top layer of synthetic material can be hardened while said synthetic material board is foamed against this hardening top layer or vice versa, or the synthetic material board and at least a portion of the top layer can be extruded together, namely, coextruded. According to a variant, said top layer can also be glued to the substrate, for example, with contact glue. According to another variant, the top layer and the substrate can be welded to each other, for example, in that they both are heated and pressed against each other. Herein, the heating preferably is performed at least on the sides of the top layer and the substrate which have to be adhered to each other. To this aim, for example, heating with infrared radiation can be chosen.

It is clear that the entire layer composition of the floor panel can be obtained by a combination of the possibilities or variants therefor mentioned herein. Namely, the top layer as such can consist of different layers, which each as such are provided on the substrate or another adjoining layer according to any of these possibilities.

Preferably, said top layer has a higher density than said substrate, or at least a density of more than 500 kilograms per cubic meter. By using a top layer of high density, nevertheless a substrate consisting of a foamed synthetic material layer of lower density can obtain a good impact resistance. The density of said top layer can be adapted, for example, by the use of filler materials, such as chalk.

It is noted that within the scope of the invention the foamed synthetic material substrate can be provided with filler materials, such as chalk, wood fiber, sand and the like. In such embodiment, savings on the amount of synthetic material can be obtained.

According to a particular preferred embodiment, said top at layer as such of at least a back layer, a motif or pattern provided thereon, and a transparent or translucent wear layer. Said back layer preferably has a thickness which is 45 percent or more of the overall thickness of the top layer. Such back layer preferably consists of a vinyl compound or polyurethane compound, wherein preferably use is made of fillers, such as chalk. The synthetic material applied therewith preferably comprises recycled synthetic material or substantially consists thereof. Preferably, the back layer is made with a higher density than the wear layer. Amongst others, to this aim the application of filler materials in the back layer is of interest. As aforementioned, for the motif or the pattern, use can be made of a printed material sheet, such as a synthetic material film or a print performed directly on the substrate. For said translucent or transparent wear layer, preferably use is made of a vinyl layer or polyurethane layer having a thickness of at least 0.2 millimeters and still better having a thickness of at least 0.3 millimeters.

Preferably, this translucent or transparent layer is made not thicker than 1 millimeter. By means of a transparent layer of 0.25 to 0.7 millimeters, a wear resistance can be obtained which is comparable to that of laminate floor panels. The transparent or translucent layer can either be applied as a film, whether or not together with the aforementioned printed film, or can be applied in liquid form and subsequently be hardened on the substrate. Preferably, the transparent or translucent layer has a thickness which corresponds to at least 25 percent of the overall thickness of the top layer. Optionally, the top layer can include a surface layer on the basis of a UV-hardened substance.

It is noted that according to the above particular embodiment, the back layer, the motif and the wear layer can be manufactured according to various possibilities. According to a first possibility, originally they all are made as a synthetic material layer, which, for example, are bonded to each other at least with the use of heat. This bond can be obtained, for example, in a heated press device, such as in a short-cycle press. Subsequently, such composed layer can be adhered to the substrate, for example, by means of an adhesive connection or by means of a welding connection, wherein the substrate and the top layer are melted together. According to a second possibility, at least the back layer and/or the wear layer are provided in liquid or paste-like form on a carrier material, such as glass fiber non-wovens, where they harden. According to this second possibility, the motif then either can be provided by means of a separate printed film, or can be printed directly on the back layer or on the bottom side of the wear layer, for example, by means of offset printing or inkjet printing, preferably by means of UV-based inks or solvent inks.

Preferably, said floor panel has a thickness of 5 to 10 millimeters, wherein said top layer as such has a thickness of 0.5 to 3 millimeters.

As aforementioned, the floor panel of the invention is intended in particular for composing floating floor coverings. To this aim, the floor panel of the invention comprises preferably at least at two opposite edges coupling means, with which two of such floor panels can be locked to each other in horizontal direction as well as in vertical direction. Preferably, herein this relates to coupling means of the type known as such from WO 97/47834. Preferably, said coupling means substantially are made as a tongue-in-groove coupling, which is provided with locking means or locking parts, wherein said tongue-in-groove coupling realizes said vertical locking, whereas said locking means or parts are provided for realizing said locking in horizontal direction.

Preferably, said coupling means substantially are realized in said foamed synthetic material board. Preferably, said coupling means are provided by means of a milling treatment with rotating milling tools. Preferably, the floor panel of the invention relates to a rectangular, either oblong or square, panel, which, at both pairs of opposite sides, is provided with mechanical coupling means.

According to a particular embodiment, the floor panel, at least at two opposite edges, for example, at the long edges of an oblong floor panel, and preferably at all opposite edges, is provided with a recessed edge having, for example, the shape of a chamfer. Such chamfer preferably is limited in depth to the thickness of said transparent or translucent layer. In the case that a deeper recessed edge is intended, the surface of the recessed edge can be provided with a separate decorative covering, or the color and/or the appearance of a possible back layer and/or the substrate can be adapted to the desired effect to be obtained. Said recessed edge preferably is realized by removing a material portion on the respective edges. As an alternative, they can also be realized by means of a deformation exerted at the location of the edge material.

According to an alternative for the above particular embodiment, said recessed edge also be provided respectively on one edge of a pair opposite edges.

According to a second independent aspect, the present invention relates to a method for manufacturing panels, wherein these panels comprise at least a substrate and a top layer provided on said substrate, wherein said top layer comprises a thermoplastic, translucent or transparent layer, with the characteristic that said method comprises at least the following steps:

the step of providing said top layer, including said thermoplastic layer, on the substrate; the step of heating at least said thermoplastic layer; and the step of structuring said thermoplastic layer at least by means of a mechanical press element.

It is clear that according to the second aspect of the invention, said thermoplastic layer as such, before being heated, already is layer-shaped. Preferably, said heating relates to heating from a temperature of less than 100° C. to a temperature of more than 100° C. Preferably, a temperature of minimum 120° C. and still better minimum 130° C. is obtained. Preferably, the temperature does not rise above 175° C. Preferably, said thermoplastic layer, before being heated, has a temperature of less than 60° C. and still better of less than 40° C. and/or is it not in a paste-like form.

For heating said thermoplastic layer, use can be made of a radiation source, preferably infrared light. As an alternative, also one or more hot-air ovens or hot-air pistols can be applied.

It is clear that the method of the second aspect preferably is applied for realizing the floor panels of the first aspect. Generally, it can also be applied, independently from the substrate material, for floor panels where such top layer, or at least said thermoplastic layer, substantially consists of a vinyl compound or a polyurethane compound. For examples of such top layers, also reference is made to the preferred first aspect, wherein then again not necessarily use is made of a foamed synthetic material board. Instead, use can be made of other synthetic material boards or of wood-based substrates, such as MDF or HDF, or of mineral boards, such as plasterboards. In any case, according to the second aspect, use preferably is made of a substrate having an average density of more than 450 kilograms per cubic meter, with a thickness situated between 5 and 12 millimeters, such that a sufficient dimensional stability is obtained.

Preferably, for the step of structuring, use is made of a press device of the cyclic type, more particular the short-cycle type; in German better known as a Kurztaktpresse. It is not excluded that the press device is applied for the step of heating the thermoplastic layer. Preferably, however, said heating of the thermoplastic layer is performed at least partially and preferably substantially or entirely prior to the press treatment. Instead of a Kurztaktpresse, use can also be made of a multiple-opening press, wherein then a plurality of thermoplastic layers are structured during the same press cycle.

Preferably, said press device is not heated. In other words, the press device preferably is applied at ambient temperature, wherein it is not excluded that the press element, by the contact with the surface of the thermoplastic layer to be structured, increases its temperature. The inventors have found that such method reduces the risk of deformations of the product. Moreover, such method results in a lower risk of the springing-back of the thermoplastic layer, such that sharp structural details can be realized.

When a heated press device is applied, such heated press cycle preferably is followed by a cold press cycle, whether or not performed in the same press device. If it is not performed in the same press device, preferably at least the same structured press element is applied. In this manner, problems with registering between two press elements can be avoided. For example, the thermoplastic layer with the press element provided thereon can be brought from one to the other press device as one stack, without interrupting the contact between the press element and the thermoplastic layer. It is noted that with a heated press cycle, preferably a temperature of more than 100° C. is reached at the surface of the thermoplastic layer, whereas with a cold press cycle preferably a temperature of less than 60° C. is reached at the surface of the thermoplastic layer.

According to a variant, the press element can be provided on the thermoplastic layer before the whole unit of at least the press element and the thermoplastic layer is fed into the press device. In such method, the thermoplastic layer, prior to the press treatment, can be at least partially heated in that the press element is heated. The heating or warming up of the press element can be performed, for example, by applying magnetic induction. In such method, it is possible to exclude a separate heating of the thermoplastic layer. As aforementioned, said press device preferably as such is not or almost not heated, such that a cooling down of the thermoplastic layer is obtained and the risk of springing back of the layer is minimized.

Preferably, a pressure of the press between 20 and 65 bar is applied, wherein a pressure of approximately 40 bar is a good value.

Preferably, pressing is performed during 12 to 60 seconds, still better during 15 to 30 seconds, and such preferably in the case of a press device of the short-cycle type.

Preferably, as the press element a flat press element or a so-called press platen is applied, which is provided with a structure. Such press element can be manufactured, for example, of metal, namely, a steel alloy, a copper alloy or an aluminum alloy, wherein the structure then can be obtained, for example, by means of etching, laser and/or milling treatments. As an alternative, use can also be made of press elements on the basis of synthetic material, for example, on the basis of melamine or Perspex (PMMA).

It is noted that a method wherein a press element on the basis of melamine or another thermo-hardening synthetic material is applied for structuring a thermoplastic layer, as such forms an independent inventive idea of the present patent application. Such press element as such can consist, for example, of one or more material sheets provided with such thermo-hardening synthetic material, such as paper layers, which are consolidated in a press device. The structure of such press element can be realized in any manner, for example, in that this press element as such is consolidated by means of a structured press element of metal, which, by means of etching, laser, and/or milling treatments, is provided with a relief. The advantage of such method is that the metal press element shows almost no wear, whereas the actual press element on the basis of a thermo-hardening synthetic material is cheap and can be considered a disposable tool. It is clear that the press element of this inventive idea preferably relates to a flat press element, or example, a press element for use in a press device of the cyclic type, in a Kurztaktpresse or in a multiple-opening press. The press element of the invention can be applied in an ideal manner in press treatments in which the press device does not have to be heated. In those applications, the reduced heat transfer of the thermo-harder is of no importance. In applications where heat transfer indeed is of importance, possibly additives in the thermo-harder can be used, which improve the heat conduction thereof, such as, for example, the addition of metal particles, carbon particles and the like. The inventors have found that a thermo-harder shows ideal detachment properties when providing a thermoplastic layer with a structure. Moreover, a thermo-harder can be provided with a sharp structure, such that the freedom of design does not have to be restricted.

Preferably, during the step of warming up, at least a pattern or motif, for example, a printed decor film, is situated on the lower side of said thermoplastic layer. Such method allows that in a smooth manner a structure can be obtained, which corresponds to the pattern or the motif. To this aim, a relative positioning between at least the pattern and the press element can be performed. Still better, the step of applying said top layer on the substrate is performed prior to or possibly at the same time with the step of heating up the thermoplastic layer. In such case, said press treatment preferably is performed a stack comprising at least the substrate and the top layer, including said thermoplastic layer. In the case of a multiple-opening press, then a plurality of such stacks are present in the same press, respectively separated by one or more structured press elements.

It is also noted that said top layer further can also comprise an UV surface coating. Such coating can be intended, for example, for obtaining a resistance against stains, in particular resulting from shoe soles, on the surface of the floor panel. Preferably, such surface coating is applied after said pressing step. Namely, the inventors have found that such surface coating results in an inferior pressing process.

It is clear that the structure, which according to the second aspect is provided in the surface of the thermoplastic layer, relates to a decorative relief, such as, for example, a relief imitating wood. Such relief can consist, for example, of separate impressions, which imitate wood pores and which together form a structure with the appearance of a wood nerve. Preferably, a plurality of such wood pores follow a wood nerve depicted in the motif. Of course, other structures can be realized, too, such as stone structures.

According to a third independent aspect, the present invention also relates to a method for manufacturing the floor panels of the first aspect and/or the preferred embodiments thereof, with the characteristic that this method comprises at least the steps of manufacturing said synthetic material board and of providing said top layer on this synthetic material board, wherein these two steps are performed continuously on the same production line. Preferably, herein said synthetic material board is extruded. The third aspect of the invention provides for an extremely smooth production process for such floor panels.

Preferably, the top layer is at least partially obtained from polyvinyl chloride (PVC) or other vinyl compounds. According to a first possibility for this, it can be started from extruded PVC, which, via heated rollers, is placed as a layer-shaped substance on a carrier material and hardens there. Herein, the carrier material either can comprise said synthetic material board, or can comprise a separate carrier material, such as a glass fiber cloth. Preferably, the carrier material is heated. Possibly, in said vinyl compounds use can be made of plasticizers, such as phthalate plasticizers isosorbide plasticizers, and/or of waxes, for obtaining a smoother process. According to a second possibility hereof, it can be started from one or more vinyl-containing synthetic material films, which are adhered to the synthetic material board, preferably after supplying heat.

Preferably, on the production line of the third aspect, larger boards consisting of foamed synthetic material layers with top layers are formed, from which afterwards, by means of at least a dividing operation, such as a sawing operation, a plurality of floor panels can be obtained.

Of course, the method of the third aspect can be combined with a method having the characteristics of the second aspect.

According to all aspects, the present invention relates to floor panels or other panels, which as such are rigid and thus as such can not be wound up. Preferably, the final panel shows a thickness of more than 5 millimeters, however, preferably less of than 15 millimeters. A good value for the thickness is 7 to 10 millimeters. Such panels are very suitable for providing mechanical coupling means thereon, which allow to couple two or more such panels at their edges to each other. Preferably, herein use is made of mechanical coupling means, such as of the type known from WO 97/47834. It is clear that also the possible larger boards, from which a plurality of such floor panels are formed, and the substrates as such are rigid. Preferably, the floor panels, boards and substrates are so rigid that they will bend less than 10 centimeters per meter under their own weight.

BRIEF DESCRIPTION OF THE DRAWINGS

With the intention of better showing the characteristics of the invention, hereafter, as an example without any limitative character, some preferred embodiments are described, with reference to the accompanying drawings.

FIGS. 5 to 7, in a view similar to that of FIG. 3, represent variants of a method for manufacturing floor panels.

DESCRIPTION OF NON-LIMITING EMBODIMENTS

Figure 1:
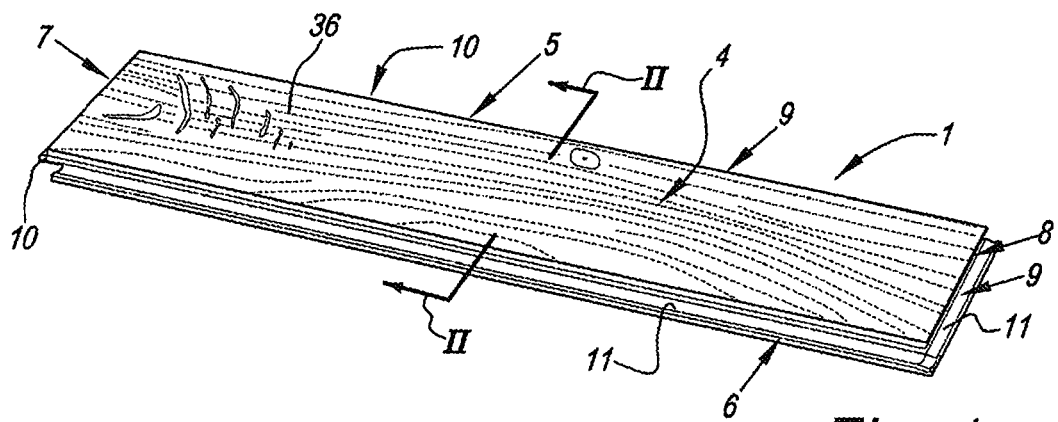
FIG. 1 in perspective represents a floor panel according to a non-limiting embodiment of the invention.

FIG. 1 represents a floor panel 1 for forming a floating floor covering.

Figure 2:
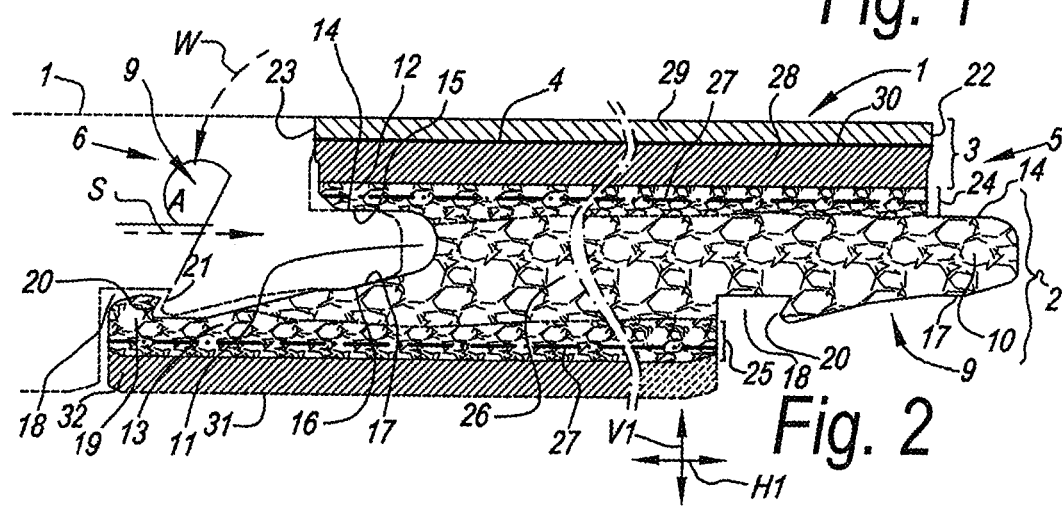
FIG. 2, at a larger scale, represents a cross-section according to the line II-II represented in FIG. 1.

FIG. 2 clearly shows that the floor panel 1 is of the type which comprises at least a substrate 2 and a top layer 3 provided on this substrate 2, wherein the top layer 3 comprises a motif 4, in this case a wood motif.

In the example of FIGS. 1 and 2, this relates to a rectangular floor panel 1, which, at the first pair 5-6 as well as at the second pair 7-8 of opposite edges, is provided with mechanical coupling means 9.

FIG. 2 represents that the coupling means 9 at the first pair 5-6 of opposite edges, namely, the long edges of the floor panel 1, substantially are performed as a tongue 10, a groove 11, respectively. Herein, the groove 11 is flanked by an upper lip 12 and a lower lip 13. When two of such floor panels 1 are coupled to each other at these edges 5-6, the cooperation of the tongue 10 and the groove 11 as such leads to a locking in a vertical direction V1 perpendicular to the plane of the floor panels 1. The cooperation between the tongue 10 and the groove 11 preferably comprises forming one or more pairs 14-15-16-17 of vertically active locking surfaces. In this case, a pair of locking surfaces 14-15 is formed between the upper surface of the tongue 10 and the lower side of the upper lip 12 and a pair 16-17 between the lower side of the tongue 10 and the upper side of the lower lip 13. At least one of said pairs 14-15, and in this case both pairs 14-15-16-17 of vertically active locking surfaces are formed in the example of the particular substrate 2 of the invention. In this manner, a strong locking in vertical direction V1 is obtained.

The coupling means 9 represented here also comprise locking means or locking parts 18-19, which result in a locking in a horizontal direction H1 perpendicular to the coupled edges 5-6 and in the plane of the coupled floor panels 1. In the example, the locking parts 18-19 are formed as an upstanding part 19 on the lower lip 13 and a recess 18 on the lower side of the tongue 10. These locking parts 18-19 are provided in each other when coupling two or more of such floor panels 1. Herein, one or more, preferably two, pairs 20-21-22-23 of horizontally active locking surfaces are created. In the example, one pair of horizontally active locking surfaces 20-21 is situated on said upstanding part 19 and cooperating therewith surface 20 of said recess 18. This pair of horizontal locking surfaces 20-21 is formed from the material of the particular substrate 2 of the invention. The respective locking surfaces 20-21 are oriented at an angle A with the surface of the floor panels 1. This angle A preferably is more than 30 degrees, and still better more than 45 degrees. Angles A of 90 degrees or more are not excluded. The second pair of horizontal locking surfaces 22-23 of the example is situated next to the floor surface, at the height of the location where the top layers 3 of two floor panels, which are coupled to each other, are flanking each other. In this case, this second pair of locking surfaces 22-23 is made substantially vertical. Moreover, this pair of horizontally active locking surfaces 22-23 is substantially and here even exclusively formed of the material of the top layer 3.

Many of the characteristics listed up above and represented in FIGS. 1 and 2 can be applied, within the scope of the invention, broader than in combination with the other characteristics of the example. The following characteristics, each individually or in any combination, can offer interesting advantages:

the characteristic that the coupling means 9 offer a locking in horizontal direction H1 as well as in vertical direction V1, independently from the fact whether the coupling means 9 are mechanical and/or are performed, whether or not substantially, in the form of a tongue 10 and groove 11;

the characteristic that at least one pair of horizontally active locking surfaces 20-21 of the coupling means 9 is realized in the substrate 2 of the invention and/or the characteristic that at least one pair of horizontally active locking surfaces 22-23 of the coupling means 9 is at least partially and preferably entirely realized in the top layer 3;

the characteristic that one or more pairs 14-15-16-17 of the vertically active locking surfaces are formed at least partially and preferably entirely from the substrate 2;

the characteristic that the mechanical coupling means 9 consist of milled profiles, which, for at least 70 percent of their circumference, are provided in the substrate 2 of the invention;

the characteristic that the first pair of opposite edges 5-6 as well as the second pair of opposite edges 7-8 is provided with coupling means;

the characteristic that the mechanical coupling means 9 allow a coupling by means of a turning movement W along the respective edges 5-6 and/or a horizontal shifting movement S of the edges towards each other and/or a downwardly directed movement of a male coupling part having for example, a tongue 10, into a female coupling part having, for example, a groove 11;

the characteristic that the lower lip 13 extends in horizontal direction beyond the upper lip 12;

the characteristic that in a coupled condition of two of such floor panels 1 a tension force is obtained between the top layers 3 of the respective floor panels 1;

herein, the lower lip 13 preferably is in a bent condition;

the characteristic that the lower lip 13, in a coupled condition, is bent.

The particularity of the present invention, at least according to its first aspect, consists in that said substrate 2 substantially consists of a foamed synthetic material board. In the example, the substrate 2 relates to a foamed PVC board of the closed cell type. The board 2 concerned has an average density of 450 kilograms per cubic meter, however, also has a local density on both flat sides 24-25, namely, a density of 500 kilograms per cubic meter or more, which is higher than the density of a central layer 26 of the synthetic material board 2. Moreover, the substrate 2 comprises separate layers 27, in this case layers of glass fiber, which increase the bending stiffness thereof. In the example, these separate layers 27 are situated on both flat sides 24-25 of the substrate 2.

The top layer 3 of the floor panel 1 of the example is a top layer 3 which substantially consists of synthetic material, namely, of a vinyl compound such as PVC (polyvinyl chloride). This top layer 3 has a higher density than the average density of the substrate 2. The represented top layer 3 as such consists of a back layer 28, a provided thereon motif 4 and a transparent wear layer 29. The back layer 28 is the thickest and densest layer of the top layer 3. It consists of recycled synthetic material, here PVC, which comprises filler material, preferably chalk. For said motif 4, use is made of a printed synthetic material film 30. For example, use can be made of a synthetic material film 30 which is printed by means of solvent inks. Such inks may result in a high-resolution print quality. The synthetic material film 30 as such can consist of PVC or another vinyl compound. For the transparent layer or wear layer 29, use is made of vinyl, such as PVC.

Preferably, said transparent layer 29 is free from filler materials or hard particles, such as aluminum oxide. The inventors have found that a transparent or translucent layer 29 of 0.2 millimeters of vinyl as such is sufficient for obtaining an acceptable wear resistance. Of course, it is not excluded that use should be made of a wear layer 29 which comprises hard particles. However, these have a negative influence on the transparency of such wear layer and lead to accelerated wear of machines which are applied when manufacturing such floor panels 1. When hard particles are applied, preferably a wear layer 29 is used having a thickness of less than 0.3 millimeters, or even less than 0.2 millimeters. Preferably, in such case use is made of hard particles in a concentration of 5 to 20 grams per square meter, wherein 10 grams per square meter represent a good value. Preferably, the applied hard particles have an average grain size between 30 and 120 micrometers, and still better between 50 and 90 micrometers.

As is mentioned in the introduction, however, not represented here, the floor panel 1 can be provided with a surface layer at its surface, for example, on the basis of a UV-hardened substance. Such layer preferably has a thickness of less than 0.1 millimeter, or still better of less than 50 micrometers. It is not excluded that such surface layer includes hard particles, such as aluminum oxide particles, wherein these hard particles preferably have an average grain size of less than 50 micrometers. Possibly, flat particles may be used here.

In dashed line 31, it is represented on FIG. 2 that a backing layer 32 can be provided on the lower side of the floor panel 1. Such backing layer 32 preferably consists of a similar material as the top layer 3, for example, of vinyl, which possibly is provided with filler material. Preferably, the density of said backing layer 32 is lower than the density of said top layer 3, or anyhow at least lower than the back layer 28, which in the example is included in said top layer 3. Preferably, the backing layer 32 consists of open cell foamed PVC or so-called cushion vinyl (cushion vinyl). Such backing layer 32 can be connected to the substrate by similar methods as the top layer 3, namely, either by gluing, by foaming it against the substrate or vice versa, by melting or by extruding or otherwise forming this backing layer 32 together with said synthetic material board 2.

Figure 3:
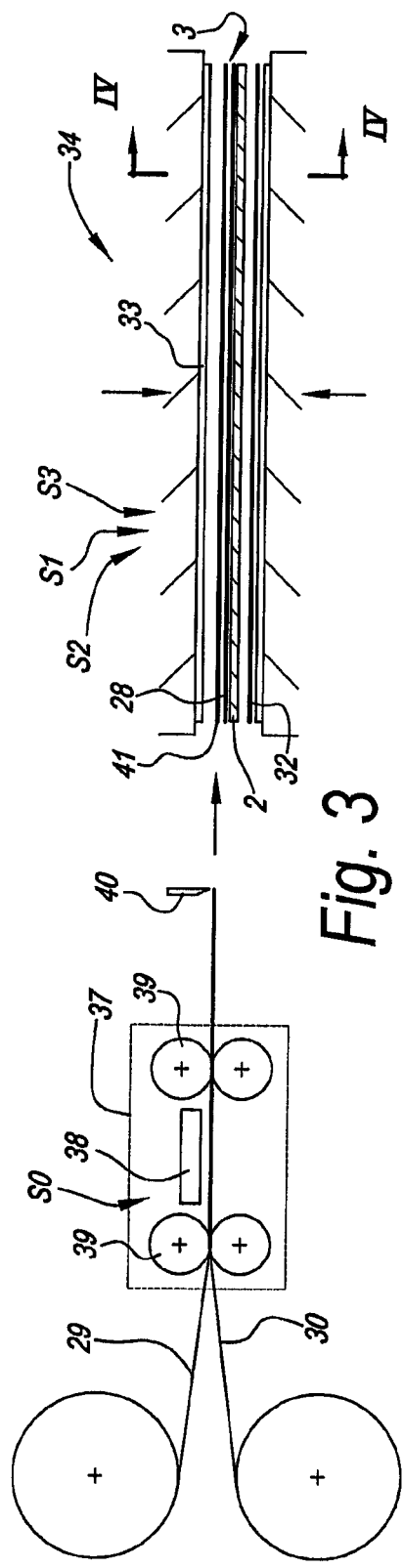
FIG. 3 schematically represents a method for manufacturing floor panels.

FIG. 3 represents a method for manufacturing floor panels 1 in accordance with the embodiment of FIGS. 1 and 2. Herein, larger boards are formed, which show the composition of such floor panel 1 and which, in a step not represented here, are divided into panels showing approximately the final dimensions of such floor panel 1. After this step of dividing, still further operations can be performed on these panels 1, such as forming coupling means or coupling parts 9 at the edges thereof.

The method comprises a step S1 where in the top layer 3 is provided on the substrate 2, and a step S2 wherein a thermoplastic translucent or transparent layer 29, which forms part of the top layer 3, is structured by means of a mechanical press element 33. In the example of FIG. 3, these two steps S1-S2 are performed simultaneously in a press device 34, for example, as represented here, in a press device 34 of the short-cycle type. As press element 33, a press platen is applied.

Figure 4:
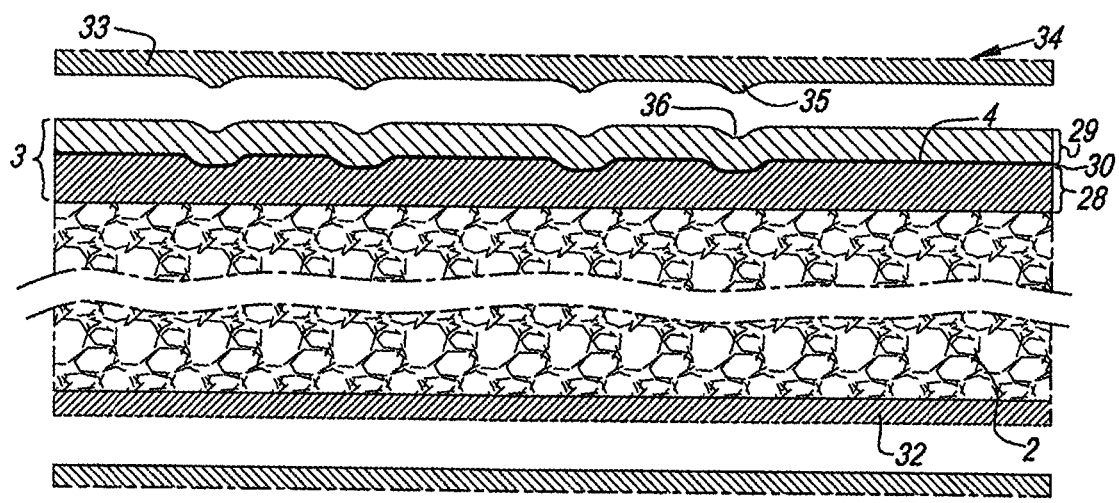
FIG. 4, at a larger scale, represents a cross-section according to the line IV-IV represented in FIG. 3.

FIG. 4 clearly shows that this press platen 33 is provided with a structure 35 which is copied by means of the press treatment at least into thermoplastic transparent or translucent layer 29. In this case, the underlying motif 4 and the back layer 28 are deformed as well. However, it is also possible that the motif 4 and/or the back layer 28 are left undisturbed during the press treatment, or that, in other words, the impressions 36 which are formed in the thermoplastic layer 29 are limited in depth, such that at least the motif 4, or the printed synthetic material film 30, is free from local deformations.

Preferably, by means of the step S2 of structuring, impressions 36 are obtained which in location and/or size correspond to the motif 4.

Prior to the press treatment, a step S0 is performed, wherein two thermoplastic layers 29-30 are adhered to each other. Namely, the synthetic material film 30 and the transparent thermoplastic layer 29 are welded or melted to each other by means of a calendar device 37. To this aim, use is made of infrared heating 38 and one or more rollers 39. The obtained whole is cut to sheets 41 by means of the cutting tool 40 and, together with the back layer 28, the substrate 2 and a backing layer 32, is brought into the press device 34.

During said press treatment, a third step S3 is performed, too. Herein, the thermoplastic translucent or transparent layer 29 is heated again, by which providing a structure by means of the press element 33 becomes possible. Moreover, by means of this heat an adherence of the thermoplastic layer 29, the synthetic material film 30, the back layer 28, the substrate 2 and the backing layer 32 is obtained. Preferably, the hot press cycle is followed by a cold or cooled press cycle, whether or not taking place in the same press device 34. Such cool cycle prevents an excessive springing back of the realized structure of impressions 36.

According to a not represented variant of FIG. 3, the thermoplastic layer 29 can be sufficiently heated prior to the press treatment, for example, by means of the represented infrared heating 38, such that it can be fed into the press device 37 in warm condition. In such case, a cold press cycle may suffice for structuring the thermoplastic layer 29. The adherence between this thermoplastic layer 29, the back layer 28, the substrate 2 and the possible backing layer 32 then preferably is obtained in another manner than by means of the cold press treatment.

Figure 5:
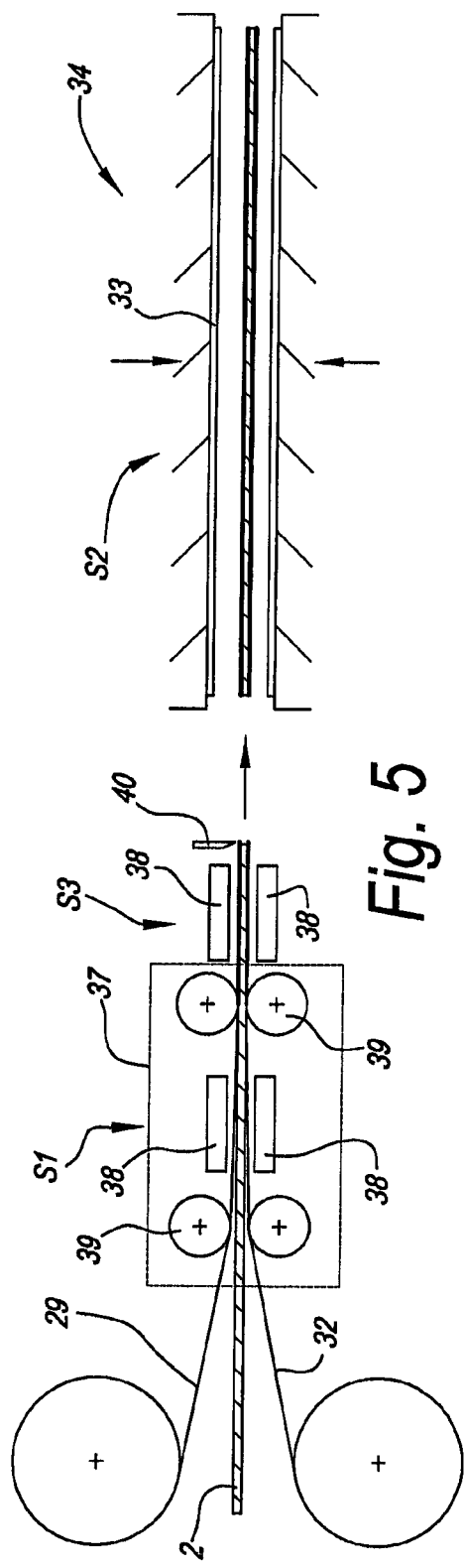

FIG. 5 represents a variant, wherein the thermoplastic layer 29 is provided on the substrate 2 prior to the step S2 of providing a structure. Schematically, a calendar device 37 is represented by which the thermoplastic layer 29 and the possible backing layer 32 are adhered to the substrate 2. It is clear that also a possible printed synthetic material film 30 and/or back layer 28, for example, also by means of such device 37, can be provided on the substrate 2 prior to the step S2 of providing a structure. In this case, the complete layer composition 2-3-32 of the floor panel 1 is obtained prior to the step S2 of providing a structure.

In accordance with the second aspect of the invention, in FIG. 5 the thermoplastic layer 29 is heated, in this case prior to the step S2 of providing a structure, by means of one or more infrared heating units 38. The thermoplastic layer 29, while it already forms part of the connected whole of substrate 2, top layer 3 and possible backing layer 32, is fed in its hot condition into the press device 34, where it is provided with impressions 36 by means of a press element 33. Preferably, here a cold press cycle is used. A similar result can be achieved as represented in FIG. 4.

FIG. 6 represents another variant, wherein the thermoplastic transparent or translucent layer 29 is formed in line with the step S1 of providing at least this thermoplastic layer 29 on the substrate 2. To this aim, an extruding machine 42 is installed above a pair of heated rollers 43. By means of the extruding machine 42, amounts of vinyl are provided between said heated rollers 43 and applied in paste-like form on a web-shaped carrier material 44, where it hardens. The carrier material 44 as such can be heated, for example, by means of one or more infrared heating units 38. The carrier material 44 preferably comprises a printed synthetic material film 30, which shows the motif 4 of the final floor panel 1. The extruded vinyl forms a thermoplastic transparent or translucent layer 29 above the motif 4. It is clear that in a similar manner also the back layer 28 and/or the backing layer 32 can be formed against the substrate 2. The step S1 of applying the thermoplastic layer 29 on the substrate 2, the step S3 of heating the thermoplastic layer and the step S2 of providing a structure in this example are performed in a similar manner as in the embodiment of FIG. 5.

It is possible that the thermoplastic layer 29 is provided with a structure at least partially prior to the step S1 of applying this layer 29 on the substrate 2. To this aim, for example, a structured roller 45 can be applied.

In the example of FIG. 6, use is made of a method having the characteristics of the third aspect of the invention. To this aim, the step of manufacturing the synthetic material board 2 and the step S1 of providing the top layer 3 on this synthetic material board 2, or at least providing at least a portion or a partial layer 28-29-30 thereof, for example, the transparent or translucent synthetic material layer 29, are performed continuously and on the same production line. In this case, the synthetic material board 2 is manufactured by means of an extrusion process, which makes use of an extruding machine 46.

FIG. 7, too, represents an embodiment having, amongst others, the characteristics of the second and the third aspect of the invention. In this case, the vinyl originating from the extruding machine 42 is provided in past-like form directly on the substrate 2, namely, without the intermediary of a carrier material. Of course, in such example already one or more other partial layers 28-29-30 of the top layer 3 can be provided on the substrate 2, such as, for example, a back layer 28 and/or a motif 4, for example, in the form of a printed synthetic material film 30. For the rest, the process represented here is similar to that represented in FIGS. 6, 7 and 8.

According to an alternative, which is not represented here, the substrate 2 and one or more partial layers 28-29-30 of the top layer 3 and/or the backing layer 32 are extruded together via so-called coextrusion. Preferably, in such case at least the back layer 28 and/or the backing layer 32 are extruded together with a synthetic material board 2, preferably a foamed synthetic material layer, such as described by means of the first aspect of the invention.

It is clear that the method illustrated in FIGS. 3 to 7 shows examples of a method having the characteristics of the second aspect of the invention. FIGS. 6 and 7 also are examples of the third aspect of the invention.

According to the embodiments of FIGS. 5, 6 and 7, the substrate 2 is supplied as an endless board material, which is divided prior to the step S2 of providing a structure. However, it is not excluded that in these embodiments, too, boards of limited length are applied, for example, a length approximately corresponding to the length of an integer of the final floor panels, for example, corresponding to one to four times this length. It is also possible that the board material from FIGS. 3, 5, 6 and 7, in endless form, is at least subjected to step S2 of providing a structure. In such embodiment, preferably a press device is applied of the continuous type. Of course, in such case the cutting device 40 preferably is arranged after the press device.

It is clear that the infrared heating units 38, as mentioned and/or represented in connection with the figures, can be replaced by any other heating apparatus. According to a particular variant, the press element 33 is provided on the thermoplastic layer 29 prior to the step S2 of providing a structure and this press element 33 is heated, wherein the heating of the thermoplastic layer 29 then occurs at least partially by the contact with the press element 33. In the case of a metallic press element 33, the warming up of the press element 33 can be performed by means of magnetic induction.

The present invention is in no way limited to the embodiments described herein above, on the contrary, such methods and floor panels can be realized according to various variants, without leaving the scope of the present invention. Moreover, the panels, instead as floor panels 1, may also be realized as wall panels or ceiling panels or even as furniture panels. Of course, the methods of the invention, mutatis mutandis, can be applied for manufacturing wall panels, ceiling panels, furniture panels or the like.

The invention claimed is:

1. A panel, wherein said panel is selected from the list consisting of a floor panel, a wall panel and a ceiling panel, said panel comprising:
   a substrate having a top side and a bottom side defining flat sides; said substrate comprising a mineral board and having a density of at least 450 kilograms per cubic meter; and a top layer provided on said substrate; said top layer comprising a print and a translucent or transparent layer based on synthetic material provided over said print;

wherein said substrate at least at two opposite edges includes mechanical coupling means consisting of milled profiles, which, for at least 70 percent of their circumference are provided in said mineral board;

wherein said substrate comprises first and second glass fiber fabric layers for increasing the bending stiffness of the substrate, said first and second glass fiber fabric layers being embedded in the mineral board proximate to the top and bottom sides, respectively;

wherein said separate layers comprise glass fiber fabrics;

wherein said mineral board at one or both of the flat sides has a local density which is higher than a central portion of said mineral board.

2. The panel of claim 1, wherein said top layer substantially consists of synthetic material.

3. The panel of claim 1, wherein said top layer comprises a primer layer positioned between said print and said top side of said substrate.

4. The panel of claim 3, wherein said translucent or transparent layer comprises particles of aluminum oxide in a concentration of 5 to 20 grams per square meter.

5. The panel of claim 4, wherein said particles of aluminum oxide have an average grain size of between 30 and 120 micrometer.

6. The panel of claim 5, wherein said average grain size is between 50 and 90 micrometer.

7. The panel of claim 1, wherein said print has a stone motif.

8. The panel of claim 7, wherein said translucent or transparent layer comprises at its surface a decorative relief imitating a stone structure.

9. The panel of claim 8, wherein said printed material sheet is adhered to said substrate by means of a glue layer.

10. The panel of claim 1, wherein said panel has a thickness of 5 to 10 mm.

11. The panel of claim 1, wherein said mechanical coupling means offer a locking in horizontal direction perpendicular to the coupled edges and in the plane of the coupled floor panels, as well as in vertical direction perpendicular to the plane of coupled panels, and wherein said mechanical coupling means are performed substantially as a tongue and a groove having locking parts, said groove being flanked by an upper lip and a lower lip, wherein said locking parts are formed as an upstanding part on the lower lip and a recess on the lower side of the tongue.

12. The panel of claim 11, wherein said lower lip extends in horizontal direction beyond said upper lip.

13. The panel of claim 12, wherein said floor panel at least at said two opposite edges is provided with a recessed edge.

14. The panel of claim 1, wherein said print is comprised on a printed material sheet.

15. A panel, said panel comprising:
a substrate having a top side and a bottom side defining flat sides; said substrate comprising a mineral board and having a density of at least 450 kilograms per cubic meter; and a top layer provided on said substrate; said top layer comprising a print and a translucent or transparent layer based on synthetic material provided over said print;

wherein said substrate at least at two opposite edges includes mechanical coupling means consisting of milled profiles, which, for at least 70 percent of their circumference are provided in said mineral board;

wherein said mechanical coupling means offer a locking in horizontal direction perpendicular to the coupled edges and in the plane of the coupled floor panels, as well as in vertical direction perpendicular to the plane of coupled panels, and wherein said mechanical coupling means are performed substantially as a tongue and a groove having locking parts, said groove being flanked by an upper lip and a lower lip, wherein said locking parts are formed as an upstanding part on the lower lip and a recess on the lower side of the tongue, wherein said lower lip extends in horizontal direction beyond said upper lip;

wherein said floor panel at least at said two opposite edges is provided with a recessed edge;

wherein said print has a stone motif and said translucent or transparent layer comprises at its surface a decorative relief imitating a stone structure;

wherein said mineral board at one or both of the flat sides has a local density which is higher than a central portion of said mineral board.

16. The panel of claim 15, wherein said substrate comprises first and second glass fiber fabric layers for increasing the bending stiffness of the substrate, said first and second glass fiber fabric layers being embedded in the mineral board proximate to the top and bottom sides, respectively.

17. The panel of claim 16, wherein said glass fiber layers are glass fiber fabrics.

18. The panel of claim 15, wherein said top layer comprises a primer layer positioned between said print and said top side of said substrate.

19. The panel of claim 15, wherein said print is comprised on a printed material sheet.

20. The panel of claim 15, wherein said panel has a thickness of 5 to 10 mm.

* * * * *